(12) United States Patent
Stoller et al.

(10) Patent No.: US 11,612,093 B2
(45) Date of Patent: Mar. 28, 2023

(54) AGRICULTURAL TRENCH DEPTH SYSTEMS, METHODS, AND APPARATUS

(71) Applicant: Precision Planting LLC, Tremont, IL (US)

(72) Inventors: Jason Stoller, Eureka, IL (US); Todd Swanson, Morton, IL (US)

(73) Assignee: Precision Planting, LLC, Tremont, IL (US)

( * ) Notice: Subject to any disclaimer, the term of this patent is extended or adjusted under 35 U.S.C. 154(b) by 402 days.

(21) Appl. No.: 16/928,477

(22) Filed: Jul. 14, 2020

(65) Prior Publication Data

US 2020/0337203 A1 Oct. 29, 2020

Related U.S. Application Data

(63) Continuation of application No. 15/999,390, filed on Aug. 20, 2018, now Pat. No. 10,743,455, which is a
(Continued)

(51) Int. Cl.
*A01B 63/00* (2006.01)
*A01C 7/20* (2006.01)
(Continued)

(52) U.S. Cl.
CPC .......... *A01B 63/008* (2013.01); *A01B 63/045* (2013.01); *A01B 63/20* (2013.01);
(Continued)

(58) Field of Classification Search
CPC ....... A01B 63/008; A01B 63/20; A01B 71/02; A01B 63/002; A01B 63/00; A01B 63/16;
(Continued)

(56) References Cited

U.S. PATENT DOCUMENTS

| 2,970,653 A | 2/1961 | Hershman |
| 3,749,035 A | 7/1973 | Cayton et al. |

(Continued)

FOREIGN PATENT DOCUMENTS

| CN | 101946576 A | 1/2011 |
| CN | 102550153 A | 7/2012 |

(Continued)

OTHER PUBLICATIONS

USPTO PCT Receiving Office, International Search Report for International Application No. PCT/US2017/018274, dated Jun. 9, 2017.
(Continued)

*Primary Examiner* — Christopher J. Novosad

(57) ABSTRACT

An agricultural planting system for controlling the depth of an opener device comprising: an agricultural planter; an opener device mounted on the agricultural planter for engaging the ground of a field; a gauge wheel mounted on the agricultural planter for rotating on the ground of the field; a GPS device coupled to the agricultural planter, the GPS device configured to determine a location of the agricultural planter in the field; and a controller in electrical communication with the agricultural planter and the GPS device, the controller having predetermined settings associated with a map of the field, the controller being configured to select a relative elevation of the opener device and the gauge wheel based at least in part on the location determined by the GPS device, and produce, based on the location, a signal for adjusting the depth of engagement into the ground of the opener device.

6 Claims, 42 Drawing Sheets

Related U.S. Application Data continuation of application No. PCT/US2017/018274, filed on Feb. 17, 2017.

(60) Provisional application No. 62/417,144, filed on Nov. 3, 2016, provisional application No. 62/366,405, filed on Jul. 25, 2016, provisional application No. 62/322,314, filed on Apr. 14, 2016, provisional application No. 62/297,535, filed on Feb. 19, 2016.

(51) Int. Cl.
| | |
|---|---|
| *A01B 63/20* | (2006.01) |
| *A01C 5/06* | (2006.01) |
| *F16H 1/16* | (2006.01) |
| *F16H 19/04* | (2006.01) |
| *F16H 25/20* | (2006.01) |
| *A01B 63/04* | (2006.01) |
| *A01B 71/02* | (2006.01) |
| *A01C 7/04* | (2006.01) |

(52) U.S. Cl.
CPC .............. *A01B 71/02* (2013.01); *A01C 5/064* (2013.01); *A01C 7/203* (2013.01); *F16H 1/16* (2013.01); *F16H 19/04* (2013.01); *F16H 25/20* (2013.01); *A01C 7/044* (2013.01); *F16H 2025/2043* (2013.01)

(58) Field of Classification Search
CPC ....... A01B 63/14; A01B 71/00; A01B 63/045; A01B 63/04; A01B 63/02; A01C 5/064; A01C 7/044; A01C 7/203; A01C 5/062; A01C 5/06; A01C 5/00; A01C 7/042; A01C 7/04; A01C 7/00; A01C 7/201; A01C 7/20; F16H 1/16; F16H 19/04; F16H 25/20; F16H 1/12; F16H 1/04; F16H 1/02; F16H 1/00; F16H 19/02; F16H 19/00; F16H 25/18; F16H 25/00; F16H 2025/2043

See application file for complete search history.

(56) References Cited

U.S. PATENT DOCUMENTS

| | | | |
|---|---|---|---|
| 4,176,721 A | 12/1979 | Poggemiller et al. | |
| 4,306,732 A | 12/1981 | Pettibone | |
| 4,353,423 A | 10/1982 | Poggemiller et al. | |
| 4,413,685 A | 11/1983 | Gremelspacher et al. | |
| 4,423,788 A | 1/1984 | Robinson, Jr. et al. | |
| 4,766,962 A | 8/1988 | Frase | |
| 5,361,712 A | 11/1994 | Townsend et al. | |
| 5,366,024 A | 11/1994 | Payne | |
| 5,499,685 A | 3/1996 | Downing, Jr. | |
| 5,562,165 A | 10/1996 | Tessier et al. | |
| 6,216,795 B1 | 4/2001 | Buchl | |
| 6,701,857 B1 | 3/2004 | Jensen et al. | |
| 8,909,436 B2 | 12/2014 | Achen et al. | |
| 9,820,350 B2* | 11/2017 | Pyshos | F21V 17/12 |
| 9,826,693 B2* | 11/2017 | Clark | A01H 5/10 |
| 10,117,300 B2* | 10/2018 | Doheny | H05B 47/195 |
| 10,163,405 B2* | 12/2018 | Kumar | F21V 23/04 |
| 10,290,265 B2* | 5/2019 | Kumar | F21V 23/009 |
| 10,292,233 B1* | 5/2019 | Udavant | F21V 7/00 |
| 10,299,335 B2* | 5/2019 | Pyshos | F21V 5/04 |
| 10,299,336 B2* | 5/2019 | Bowen | H05B 45/20 |
| 10,460,675 B2* | 10/2019 | Kumar | G09G 3/3413 |
| 10,502,404 B1* | 12/2019 | Bowen | H02G 3/20 |
| 10,506,682 B2* | 12/2019 | Doheny | H05B 45/12 |
| 10,575,380 B2* | 2/2020 | Udavant | F21V 7/00 |
| 10,602,584 B2* | 3/2020 | Pyshos | F21K 9/62 |
| 10,616,969 B2* | 4/2020 | Bowen | F21S 8/026 |
| 10,681,785 B2* | 6/2020 | Doheny | F21V 23/06 |
| 10,701,853 B2* | 7/2020 | Swanson | F16H 19/04 |
| 10,718,501 B2* | 7/2020 | Bowen | F21V 23/04 |
| 10,726,794 B2* | 7/2020 | Kumar | F21S 8/026 |
| 10,733,944 B2* | 8/2020 | Kumar | F21V 23/0442 |
| 10,743,455 B2* | 8/2020 | Sloneker | A01B 71/02 |
| 10,904,970 B2* | 1/2021 | Udavant | F21V 3/02 |
| 11,002,424 B2* | 5/2021 | Pyshos | F21S 8/026 |
| 11,085,621 B2* | 8/2021 | Bowen | F21V 23/06 |
| 11,105,476 B2* | 8/2021 | Bowen | F21V 21/088 |
| 11,280,660 B2* | 3/2022 | Splichal, Jr. | G21C 17/112 |
| 11,371,682 B2* | 6/2022 | Doheny | H05B 47/105 |
| 11,408,588 B2* | 8/2022 | Pyshos | F21S 8/026 |
| 2004/0079223 A1 | 4/2004 | Steinlage et al. | |
| 2012/0048160 A1 | 3/2012 | Adams et al. | |
| 2012/0227992 A1 | 9/2012 | Henry | |
| 2013/0104785 A1 | 5/2013 | Akhen et al. | |
| 2015/0230391 A1 | 8/2015 | Houck | |
| 2016/0037709 A1* | 2/2016 | Sauder | A01C 7/105 700/275 |
| 2016/0316614 A1 | 11/2016 | Westphal et al. | |
| 2019/0216005 A1* | 7/2019 | Bassett | A01B 63/22 |

FOREIGN PATENT DOCUMENTS

| | | |
|---|---|---|
| CN | 109892067 A | 6/2019 |
| EP | 3501248 A1 | 6/2019 |
| GB | 253566 A | 6/1926 |
| GB | 761116 A | 11/1956 |
| IN | 201617004460 A | 7/2016 |
| JP | 2006345805 A2 | 12/2006 |
| WO | 2012/149415 A1 | 11/2012 |
| WO | 2015019942 A1 | 2/2015 |

OTHER PUBLICATIONS

European Patent Office, Search Report for related European Application No. EP 20 18 7896, dated Apr. 30, 2021.

\* cited by examiner

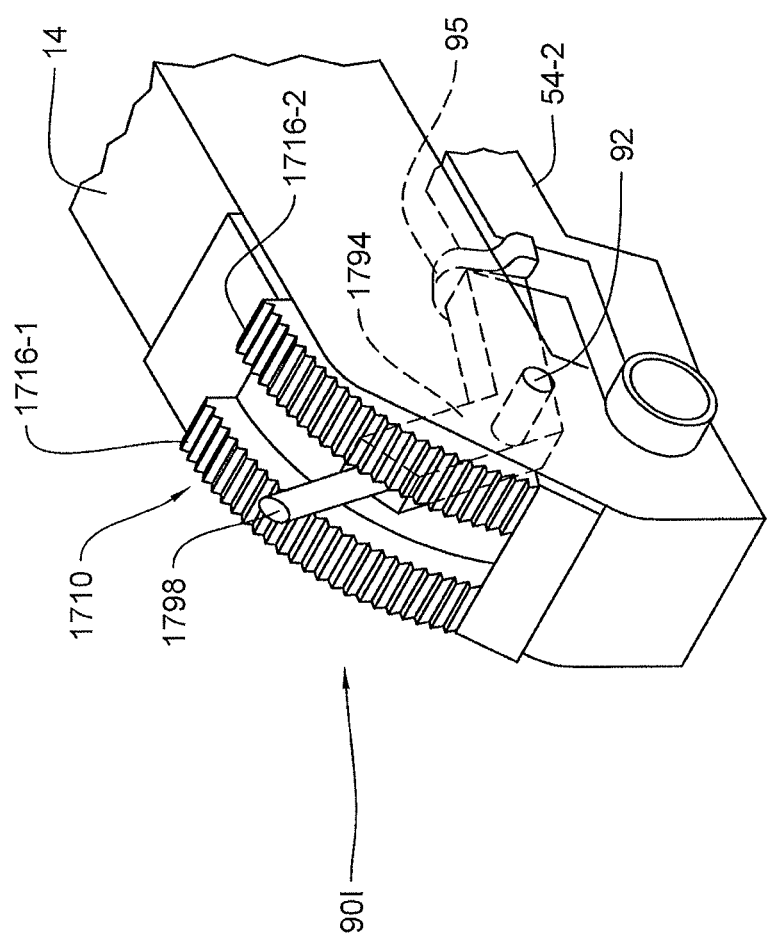

AGRICULTURAL TRENCH DEPTH SYSTEMS, METHODS, AND APPARATUS

CROSS-REFERENCE TO RELATED APPLICATIONS

This application is a continuation of U.S. Ser. No. 15/999,390, filed 20 Aug. 2018, which is a continuation of PCT Application No. PCT/US2017/018274, filed 17 Feb. 2017, which claims priority to U.S. Provisional Application Nos. 62/297,535, filed 19 Feb. 2016; 62/322,314; filed 14 Apr. 2016; 62/366,405, filed 25 Jul. 2016; and 62/417,144, filed 3 Nov. 2016, all of which are incorporated herein by reference in their entireties.

BACKGROUND

In recent years, farmers have recognized the need to select and maintain the proper planting depth to ensure the proper seed environment (e.g., temperature and moisture) and seedling emergence. To improve agronomic practices, it would also be desirable for the farmer to understand the relationship between actual planting depth and metrics such as emergence and yield. Conventional agricultural planters include only apparatus for adjusting a maximum planting depth, which may not be maintained during operation due to soil conditions or insufficient downpressure on the planter row unit. Even in operation of modern planters having sensors for determining whether full trench depth has been lost, the actual depth planted is still not determined. Thus there is a need for systems, methods and apparatus for controlling and/or measuring the depth of a trench opened by an agricultural planter.

DESCRIPTION OF THE DRAWINGS

FIG. 16 is a partial perspective view of another embodiment of a depth adjustment assembly with a rotary actuator disposed on a gear rack on the row unit frame.

DESCRIPTION

Figure 1:
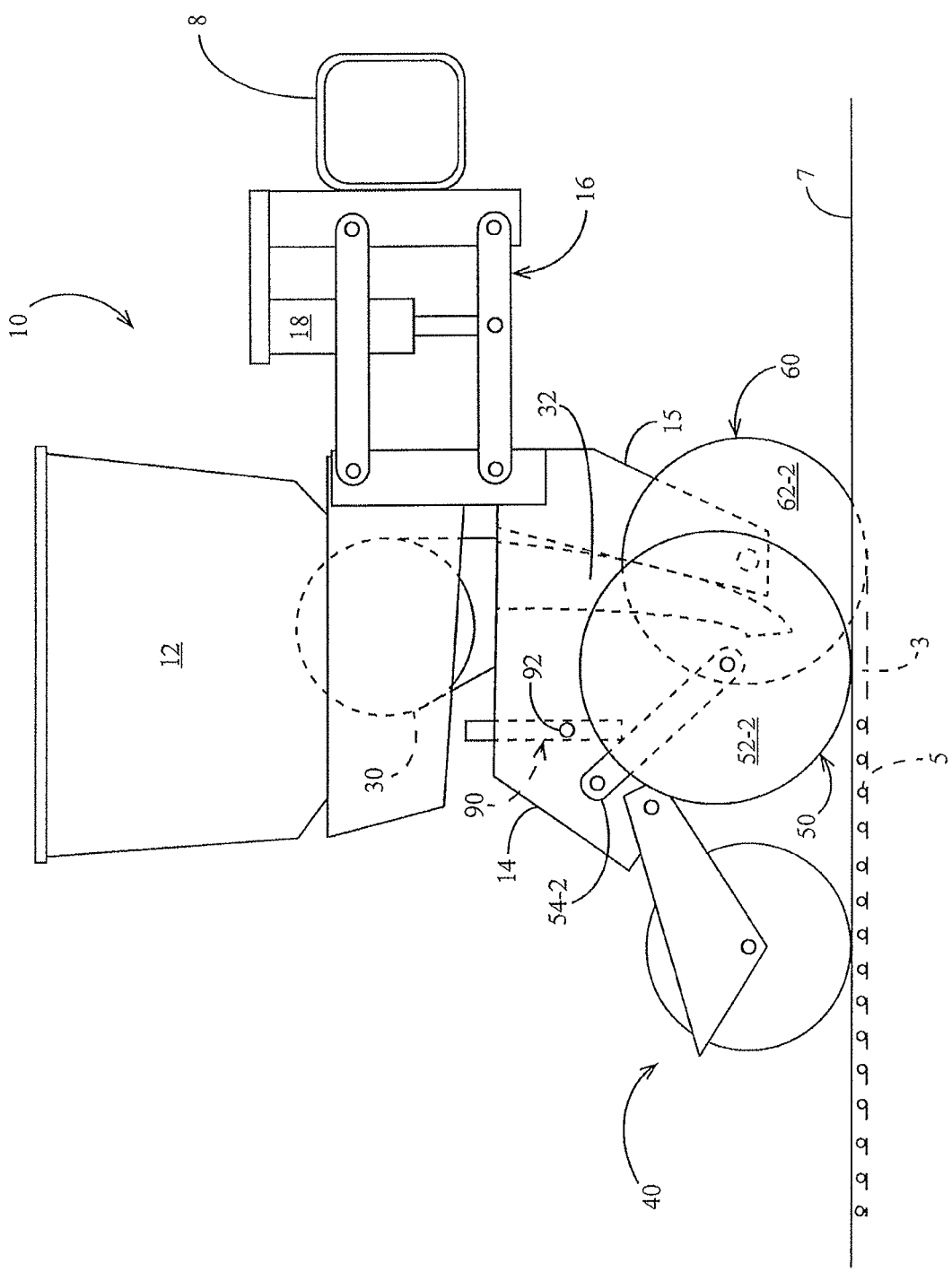
FIG. 1 is a right side elevation view of an embodiment of an agricultural row unit.
Figure 2:
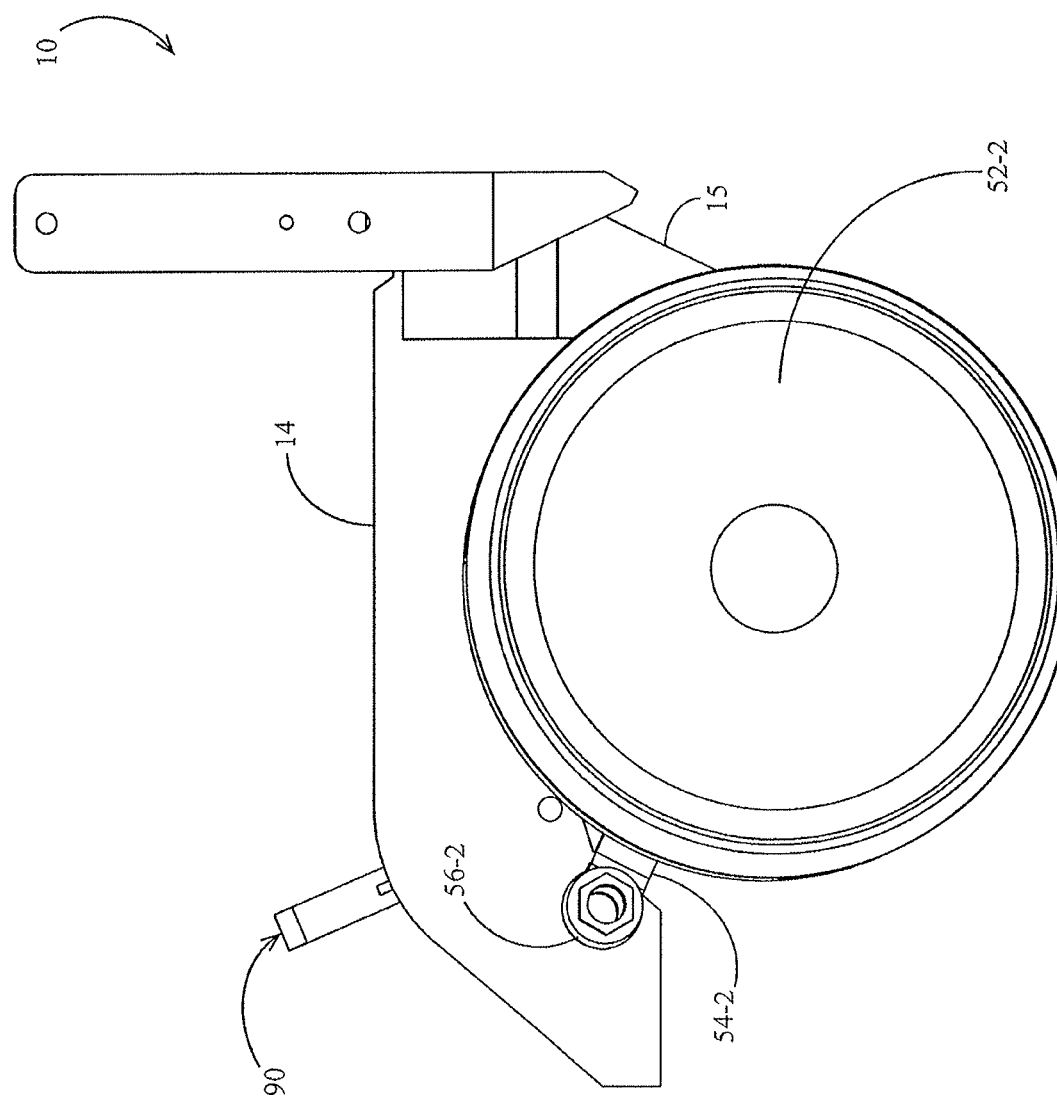
FIG. 2 is a right side elevation view of another embodiment of an agricultural row unit with certain components removed for clarity.
Figure 3:
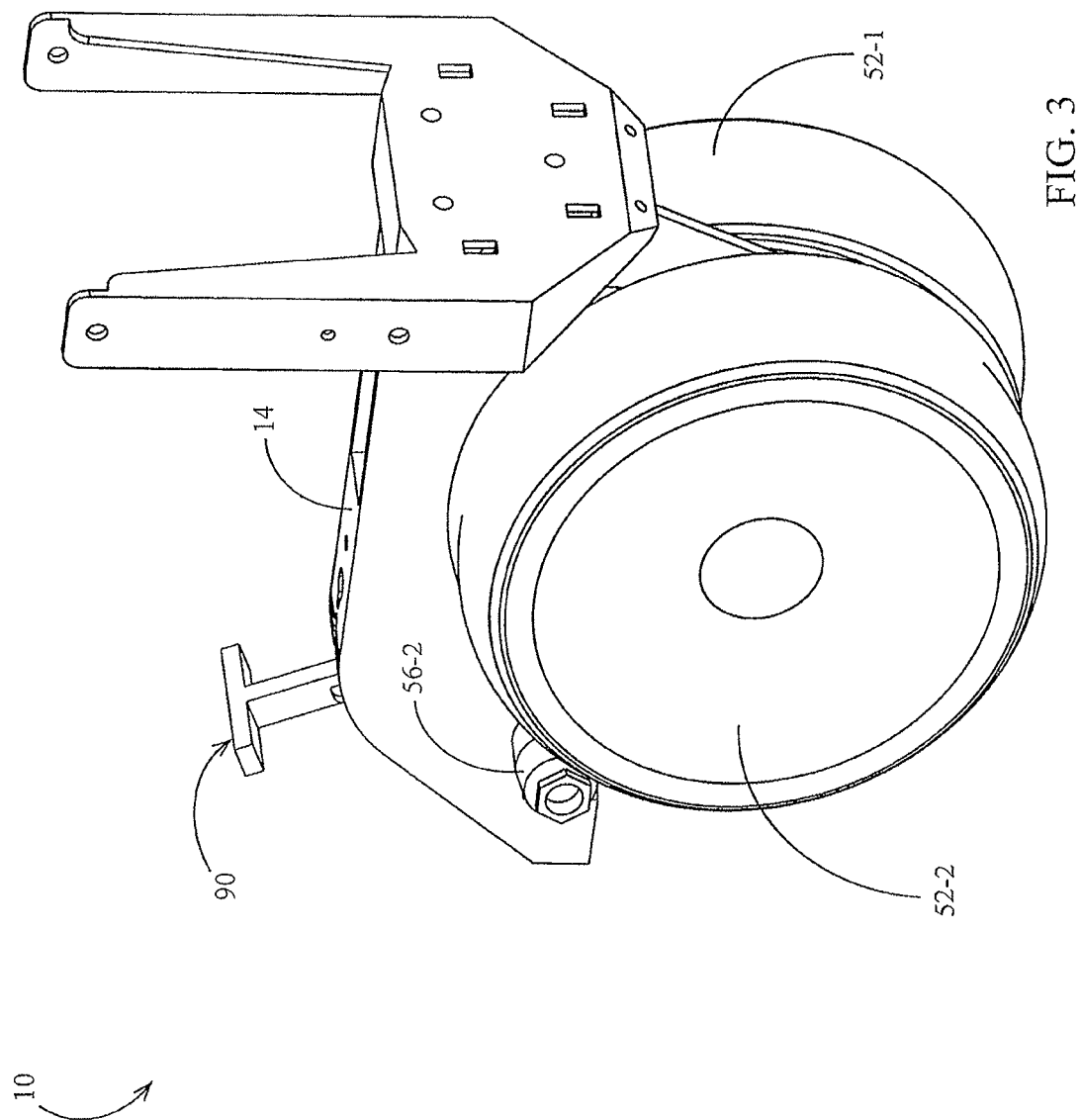
FIG. 3 is a perspective view of the agricultural row unit of FIG. 2.
Figure 4:
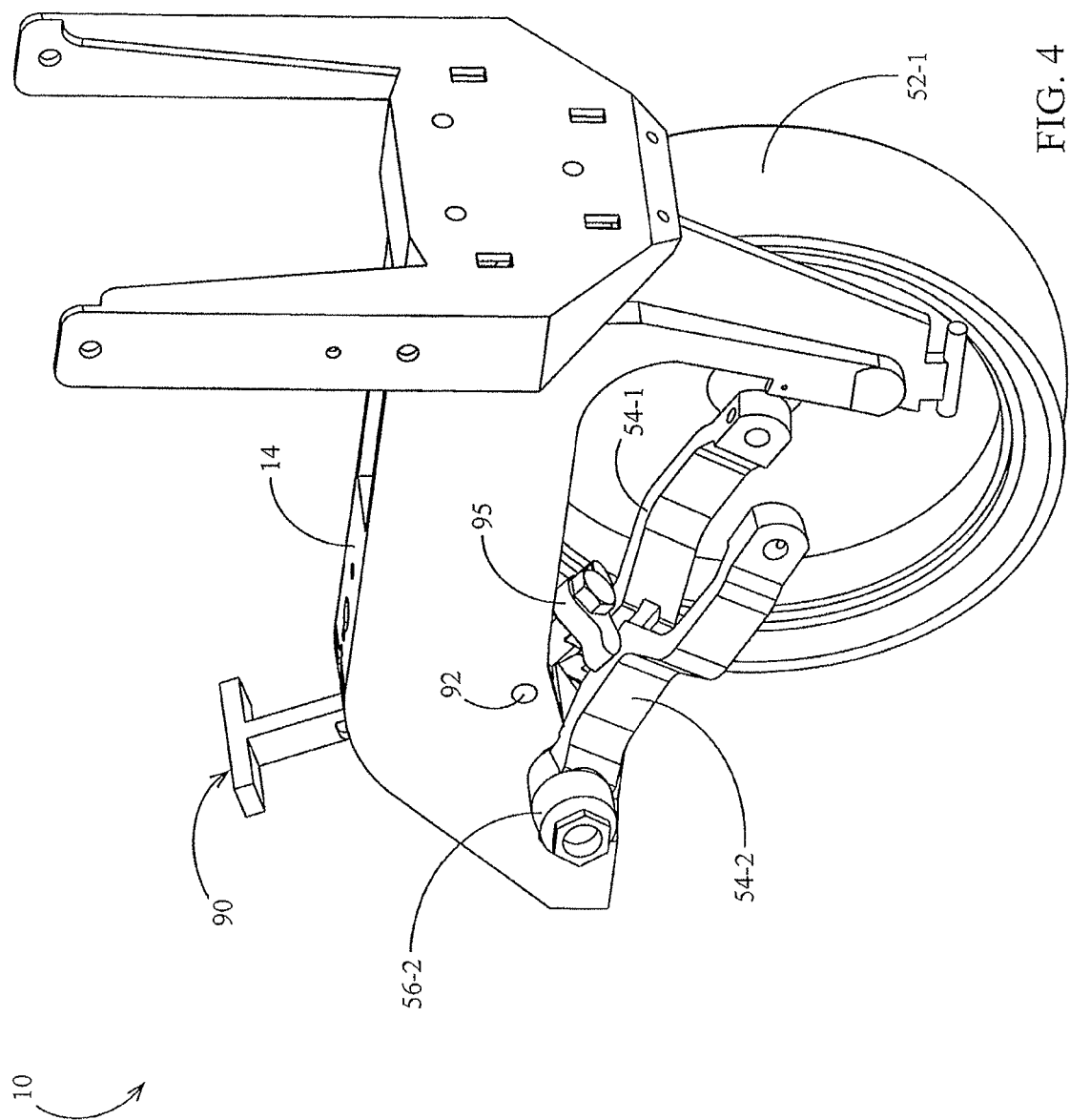
FIG. 4 is a perspective view of the agricultural row unit of FIG. 2 with a right gauge wheel removed for clarity.
Figure 5:
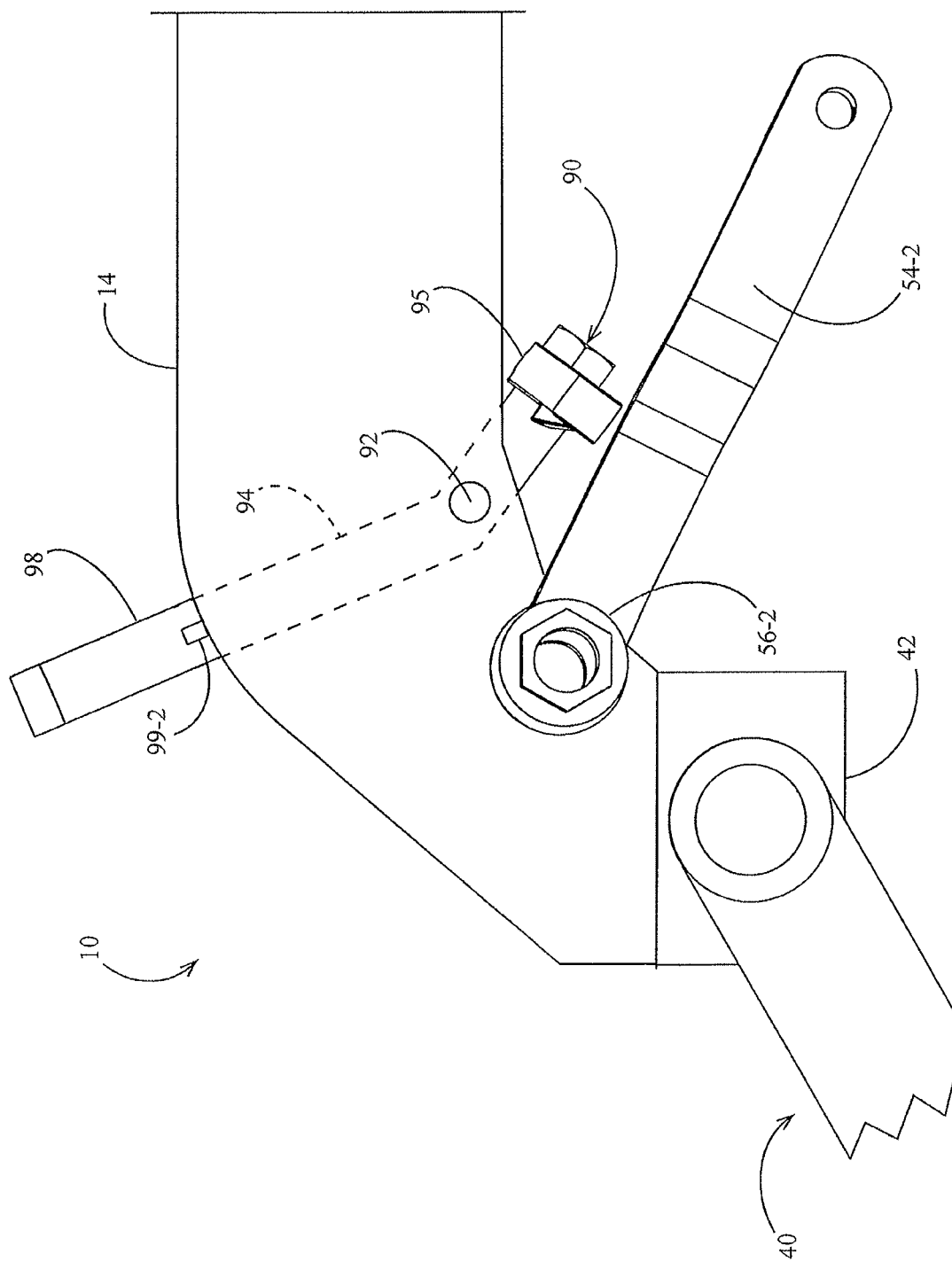
FIG. 5 is an enlarged partial right side elevation view of the agricultural row unit of FIG. 2.
Figure 6:
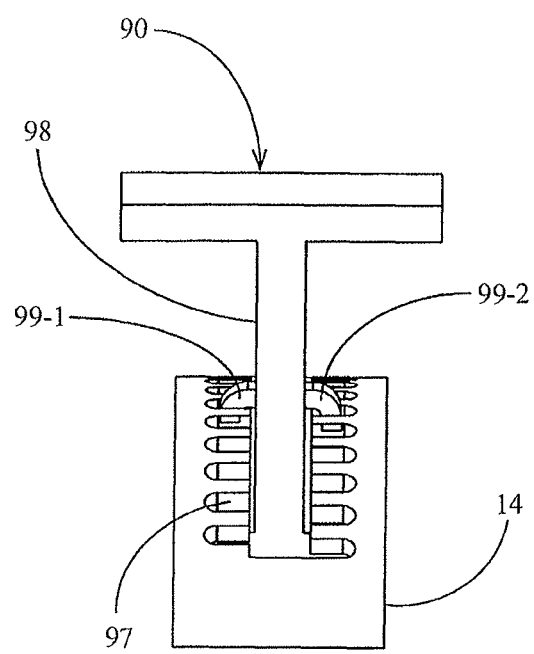
FIG. 6 is a rear elevation view of the agricultural row unit of FIG. 2.

Referring now to the drawings, wherein like reference numerals designate identical or corresponding parts throughout the several views, FIG. 1 illustrates an agricultural implement, e.g., a planter, comprising a toolbar 8 to which multiple row units 10 are mounted in transversely spaced relation. Each row unit 10 is preferably mounted to the toolbar by a parallel arm arrangement 16 such that the row unit is permitted to translate vertically with respect to the toolbar. An actuator 18 is preferably pivotally mounted to the toolbar 8 and the parallel arm arrangement 16 and configured to apply supplemental downpressure to the row unit 10.

The row unit 10 preferably includes a frame 14. The row unit 10 preferably includes an opening disc assembly 60 including two angled opening discs 62 rollingly mounted to a downwardly extending shank 15 of the frame 14 and disposed to open a v-shaped trench 3 (i.e., furrow, seed furrow) in a soil surface 7 as the row unit traverses a field. The row unit 10 preferably includes a gauge wheel assembly 50 including two gauge wheels 52 pivotally mounted to either side of the frame 14 by two gauge wheel arms 54 and disposed to roll along the surface of the soil. A depth adjustment assembly 90 pivotally mounted to the frame 14 at a pivot 92 preferably contacts the gauge wheel arms 54 to limit the upward travel of the gauge wheel arms 54, thus limiting the depth of the trench opened by the opening disc assembly 60. A closing assembly 40 is preferably pivotally coupled to the frame 14 and configured to move soil back into the trench 3.

Continuing to refer to FIG. 1, seeds 5 are communicated from a hopper 12 to a seed meter 30 preferably configured to singulate the supplied seeds. The meter 30 is preferably a vacuum-type meter such as that disclosed in Applicant's International Patent Pub. No. WO/2012/129442, the disclosure of which is hereby incorporated by reference herein in its entirety. In operation, the seed meter 30 preferably deposits the supplied seeds into a seed tube 32. The seed tube 32 is preferably removably mounted to the frame 14; in operation, seeds 5 deposited by the meter 30 fall through the seed tube 32 into the trench 3.

Figure 7:
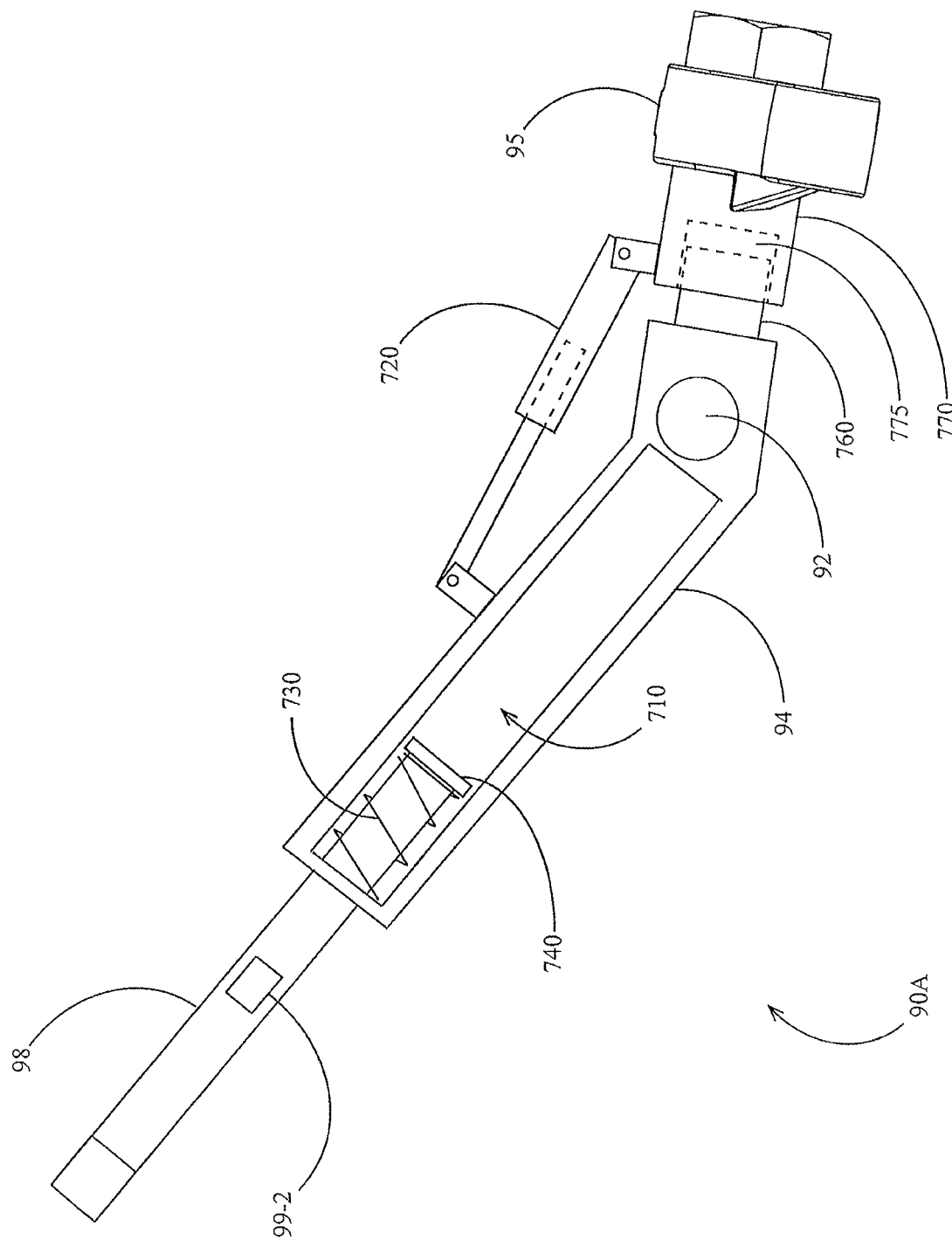
FIG. 7 is a side elevation view of an embodiment of a depth adjustment assembly and a secondary depth adjustment assembly.

Turning to FIGS. 2-6, the depth adjustment assembly 90 is illustrated in more detail. The depth adjustment assembly 90 includes a rocker 95 pivotally mounted to a depth adjustment body 94. The depth adjustment body 94 is pivotally mounted to the row unit frame 14 about the pivot 92. A handle 98 is preferably slidably received within the depth adjustment body 94 such that the user can selectively engage and disengage the handle (e.g., left and right hooks 99-1, 99-2, respectively, which may be formed as a part of the handle 98) with one of a plurality of depth adjustment slots 97 (FIG. 6) formed within the row unit frame 14. With reference to FIG. 7, the handle 98 is partially slidingly received within a cavity 710 of the depth adjustment body 94, and an optional spring 730 engages an annular lip 740 disposed on the bottom end of the handle 98; the spring 730 thus imposes a resilient force to retain the hooks 99 in the selected slot 97 but permits the user to withdraw the handle 98 to temporarily disengage the hooks 99 from the slot 97. In operation, the upward travel of the gauge wheels 52 is limited by contact of the gauge wheel arms 54 with the rocker 95. When one of the gauge wheels, e.g., left gauge wheel 52-1, encounters an obstruction, the rocker 95 allows the left gauge wheel arm 54-1 to travel upward while lowering the right gauge wheel 52-2 by the same absolute displacement such that the row unit 10 rises by half the height of the obstruction.

It should be appreciated that the handle 98 and depth adjustment body 94 comprise a primary depth adjustment sub-assembly configured to permit the user to select one of a plurality of pre-selected furrow depths. The pre-selected furrow depths each correspond to one of the depth adjustment slots 97. In some embodiments, rather than using the handle 98 to manually select a depth adjustment slot, an actuator may be used to adjust the position of handle 98; for example, a linear actuator (not shown) mounted to the row unit frame 14 may be disposed to adjust the position of the handle 98, or a rotary actuator may turn a gear which adjusts the position of the handle relative to the depth adjustment slots 97.

In each of the embodiments illustrated in FIGS. 7-10 and 12, a secondary depth adjustment assembly is configured to modify one or more of the pre-selected furrow depths. The secondary depth adjustment assembly may modify the pre-selected furrow depths by more precise adjustments (e.g., by smaller adjustment steps) than the depth modifications enabled by the primary depth adjustment assembly (e.g., by selecting which depth adjustment slot 97 is engaged by the handle 98). For example, referring FIG. 7, the depth adjustment assembly 90A includes an actuator 720 which adjusts the effective length of the depth adjustment assembly 90A. In the illustrated embodiment, the extension of actuator 720 determines the position of the rocker 95 relative to the depth adjustment body 94. As illustrated, the rocker 95 is pivotally mounted to a movable member 770 having a cavity 775 for receiving a protrusion 760 preferably mounted to (or formed as a part with) the depth adjustment body 94. The protrusion 760 and cavity 775 retain the alignment of the moveable member relative to the depth adjustment body 94, but permit the actuator 720 to modify the position along an axis which is preferably parallel to the pivot axis of the rocker 95. It should be appreciated that modification of the extension of actuator 720 (and thus the effective length of the depth adjustment assembly) modifies the furrow depth for any given depth setting of the handle 98. Any of the secondary depth adjustment assemblies described herein can be used as the only depth adjustment. The primary depth adjustment does not need to be set. The secondary depth adjustment can adjust across the entire range of depth setting.

Figure 8:
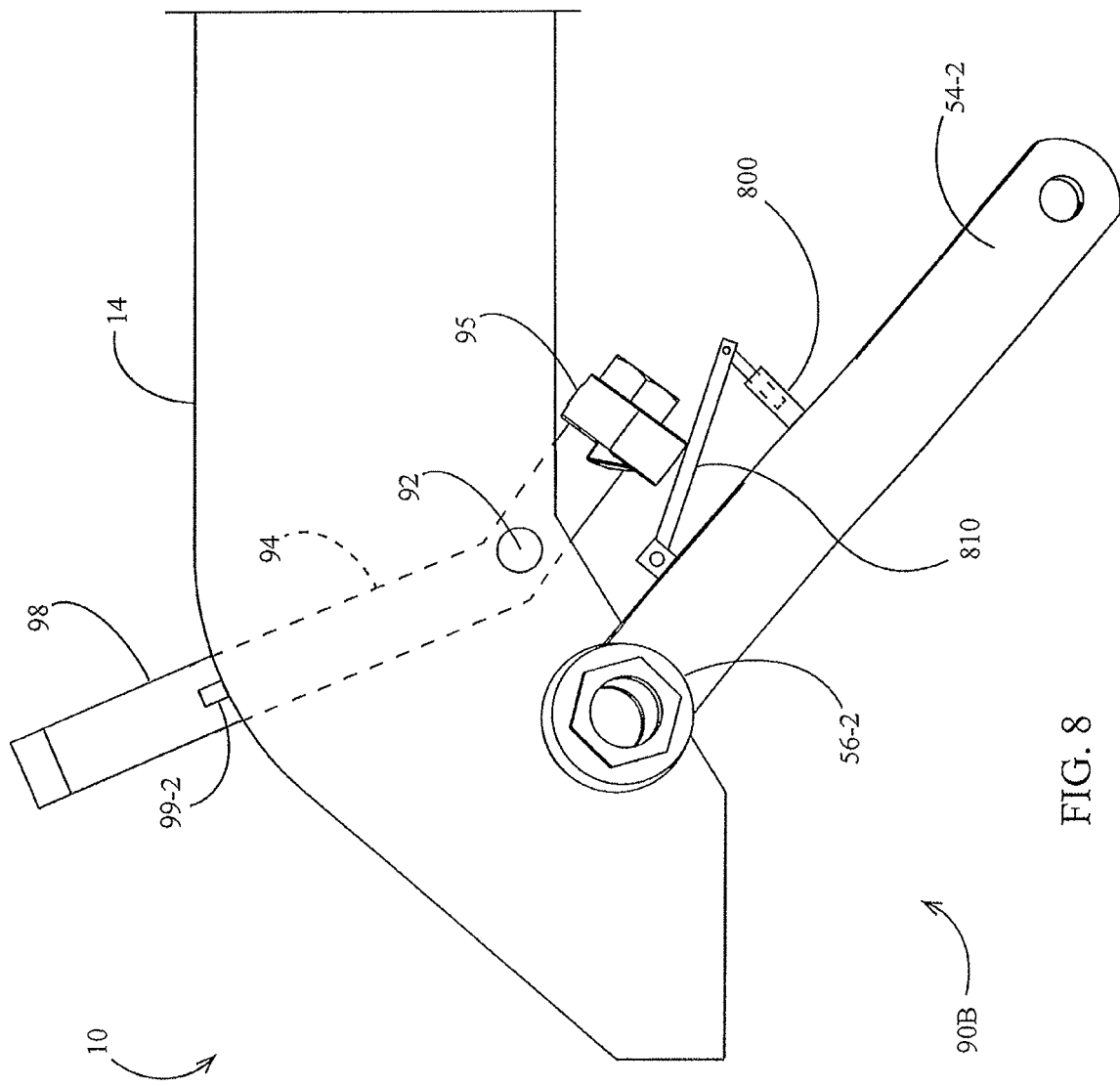
FIG. 8 is a side elevation view of another embodiment of a depth adjustment assembly and a secondary depth adjustment assembly.

FIG. 8 illustrates another embodiment of a depth adjustment assembly 90B having a secondary depth adjustment assembly wherein an actuator 800 modifies the angular position at which one or more gauge wheel arms 54 is stopped by the depth adjustment assembly 90B for any given setting of the depth adjustment handle 98. The actuator 800 preferably adjusts a position of a surface 810 which is pivotally mounted to the gauge wheel arm 54; the surface 810 is preferably disposed to contact the rocker 95 at the point of maximum upward travel of the gauge wheel arm 54. Extension of the actuator 800 and thus modification of the position of surface 810 thus preferably modifies the point of maximum upward travel of the gauge wheel and thus modifies the furrow depth determined by the gauge wheel. In some embodiments, a functionally similar actuator 800 and pivotally-mounted surface 810 may be mounted to both gauge wheel arms 54.

Figure 9:
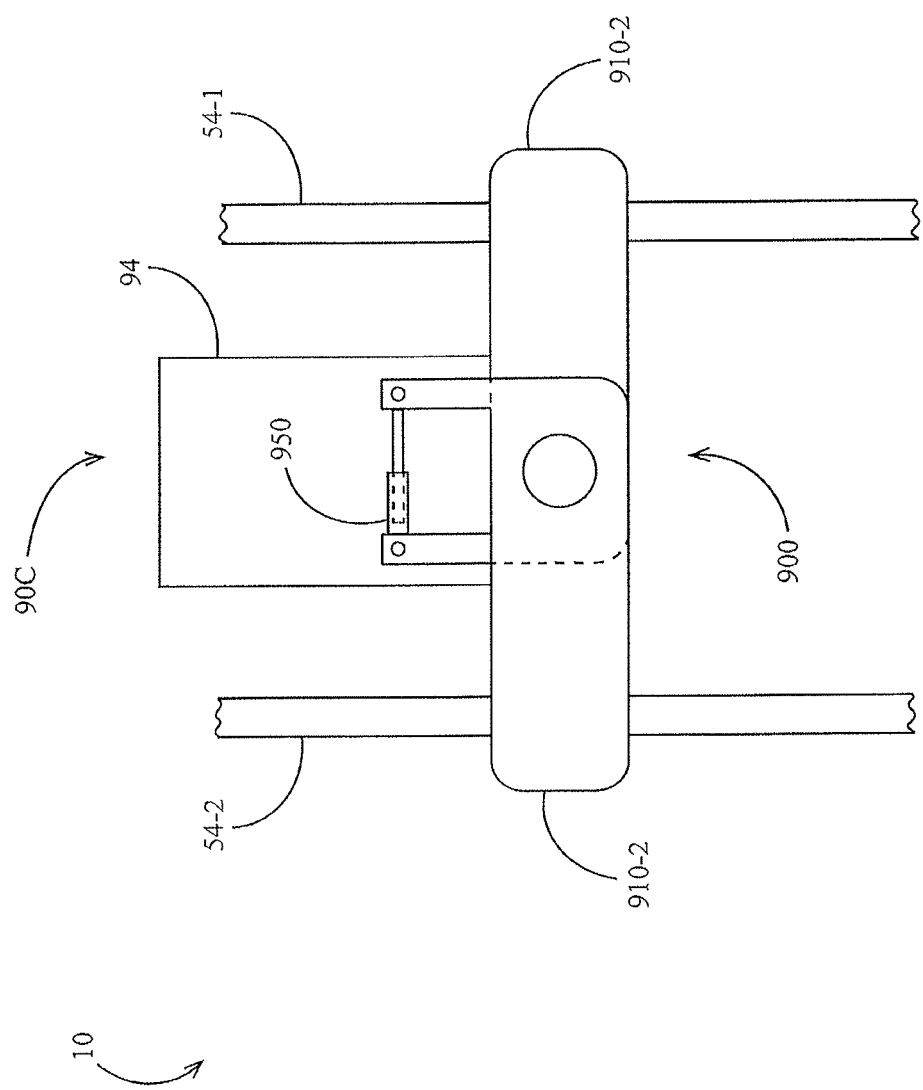
FIG. 9 is a side elevation view of another embodiment of a depth adjustment assembly and a secondary depth adjustment assembly.

FIG. 9 illustrates another embodiment of a depth adjustment assembly 90C having a secondary depth adjustment assembly wherein a modified rocker 900 is configured to modify its shape in order to modify the furrow depth for any given depth setting of the handle 98. The rocker 900 preferably includes portions 910-1, 910-2 which contact the gauge wheel arms 54-1 and 54-2, respectively, to limit the upward travel of the gauge wheel arms. An actuator 950 preferably changes the angle between the portions 910-1 and 910-2 and thus the shape of the rocker 900. Retraction of the actuator 950 preferably raises the members 910 and thus modifies the maximum height of the gauge wheel arms 54 and the furrow depth.

Figure 10:
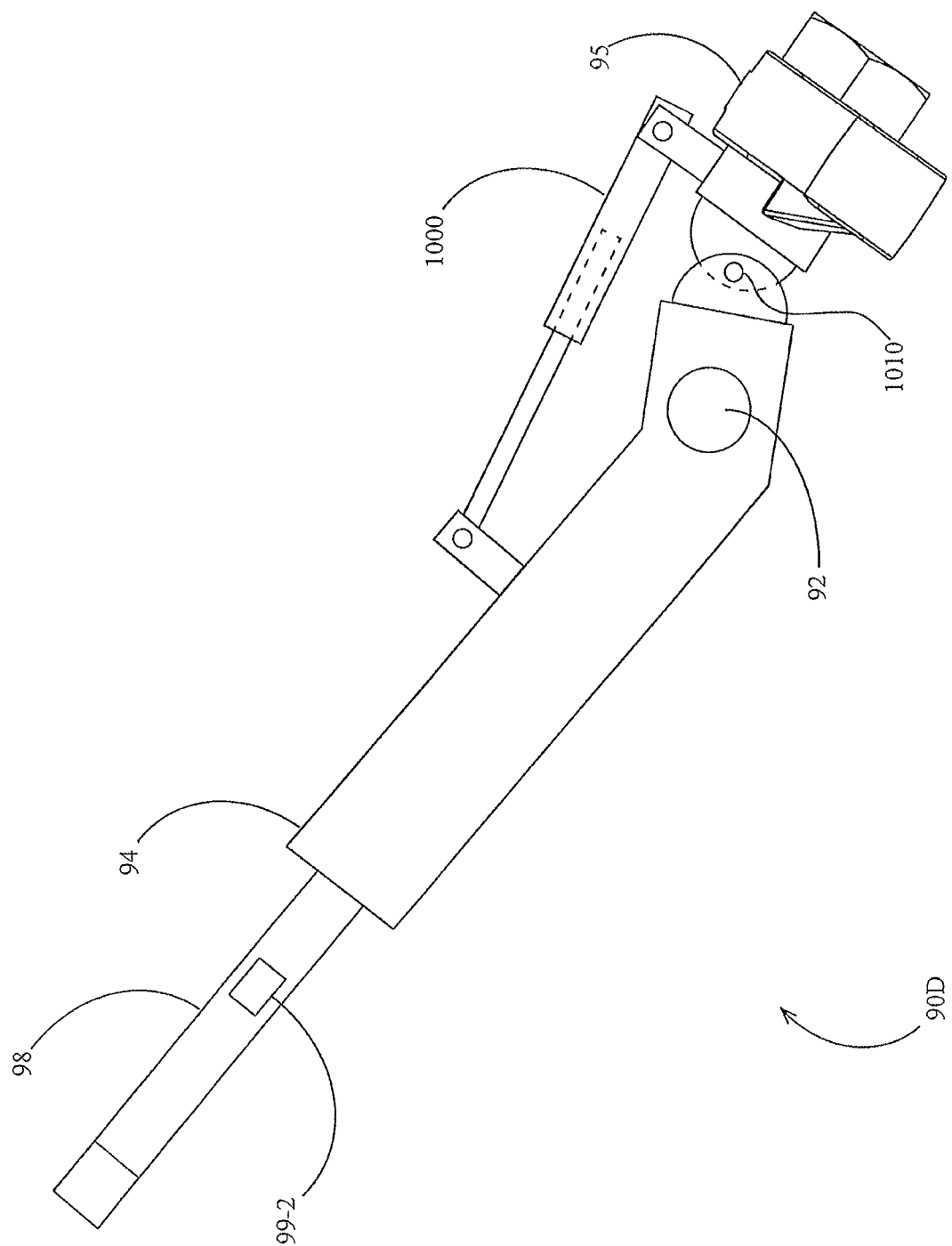
FIG. 10 is a side elevation view of another embodiment of a depth adjustment assembly and a secondary depth adjustment assembly.

FIG. 10 illustrates another embodiment of a depth adjustment assembly 90D having a secondary depth adjustment assembly wherein the rocker 95 is pivotally mounted to the depth adjustment body 94, preferably about a laterally extending axis defined by pivot 1010. An actuator 1000 preferably determines the angular position of the rocker 95 about the pivot 1010 relative to the depth adjustment body 94, thus modifying the maximum upward travel of the gauge wheel arms 54 and the furrow depth.

Figure 10A:
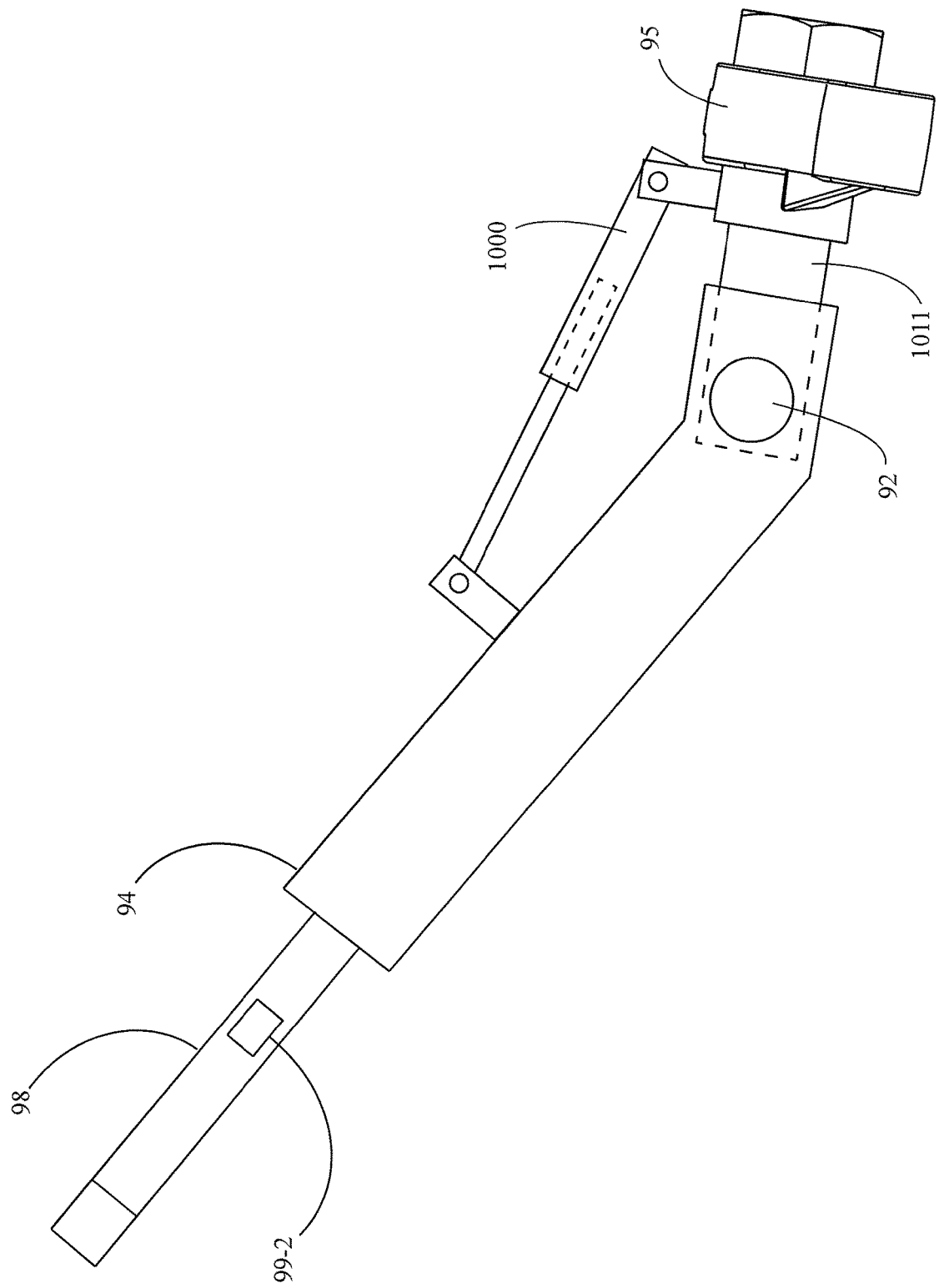
FIG. 10A is a side elevation view of another embodiment of a depth adjustment assembly and a secondary depth adjustment assembly.

FIG. 10A illustrates an alternative to the embodiment illustrated in FIG. 10. Pivot 1010 is removed, and rocker 95 is attached to connector 1011, which pivots about pivot 92.

Figure 12:
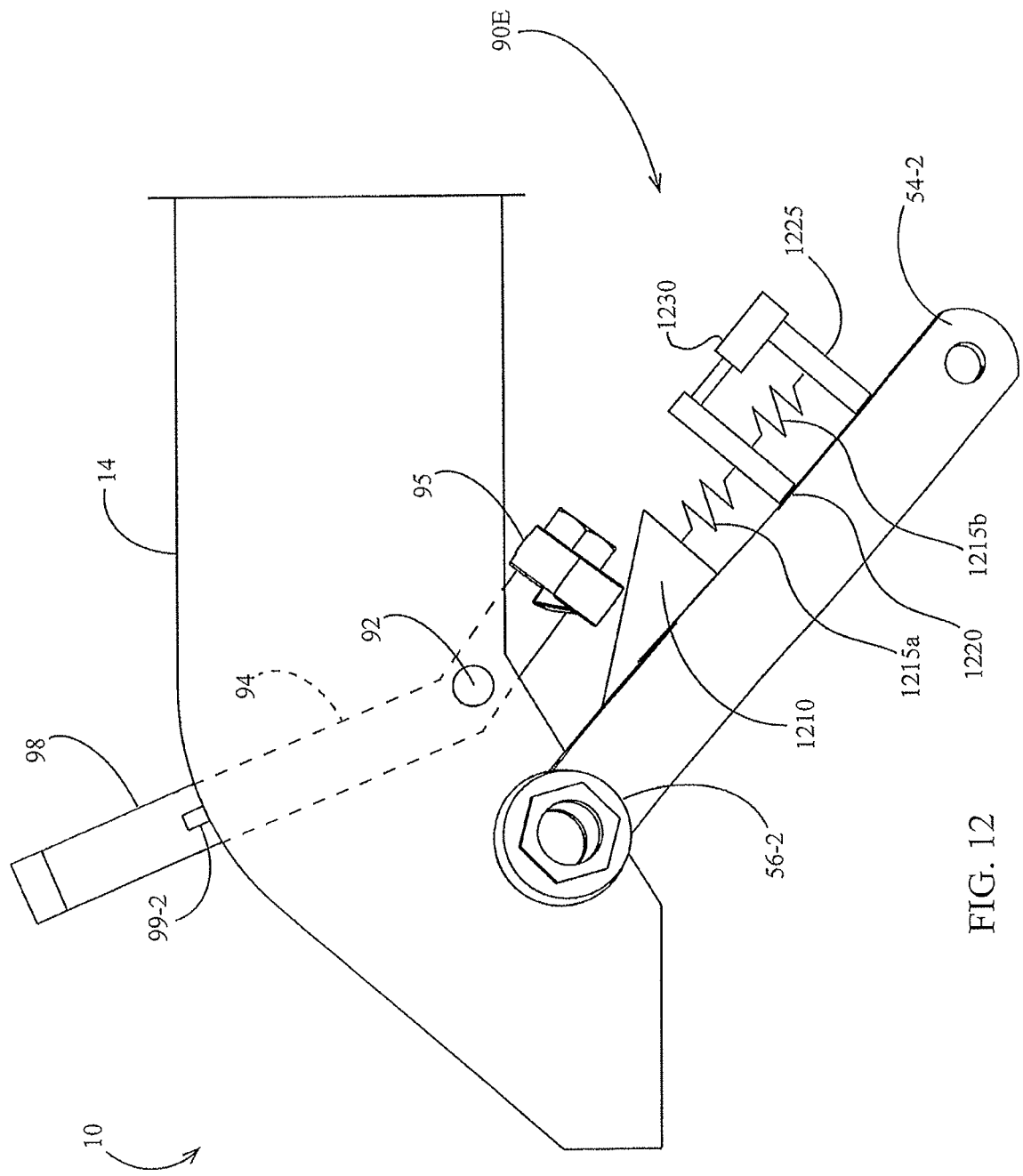
FIG. 12 is a side elevation view of another embodiment of a depth adjustment assembly and a secondary depth adjustment assembly.

FIG. 12 illustrates another embodiment of a depth adjustment assembly 90E having a secondary depth adjustment assembly wherein an actuator 1230 advances a depth adjustment member 1210 (e.g., a wedge) which is preferably slidingly fixed to the gauge wheel arm and disposed to slide along the length of the gauge wheel arm 54. An actuator 1230 (e.g., a linear actuator such as an electric, hydraulic, or pneumatic actuator) preferably selectively modifies (e.g., by extension or retraction) the position of the depth adjustment member 1210, e.g., along the length of the gauge wheel arm 54. The position of the depth adjustment member 1210 along the length of the gauge wheel arm preferably modifies the uppermost angular position of the gauge wheel arm relative to the rocker 95 and thus preferably modifies the depth of the furrow opened by the row unit in operation. The actuator 1230 may be mounted to the gauge wheel arm 54, e.g., by being fixed to a plate 1225 mounted to the gauge wheel arm 54.

In some embodiments, the actuator 1230 may adjust the position of the depth adjustment member 1210 by means of a biasing mechanism. The biasing mechanism preferably increases or reduces a biasing force on the wedge 1210 as the actuator 1230 is extended. For example, as illustrated in FIG. 12, the actuator 1230 may modify a position of a biasing member such as a plate 1220 relative to the depth adjustment member 1210. Optionally, a first spring 1215a is preferably fixed to the depth adjustment member 1210 at a first end thereof and is preferably fixed to the plate 1220 at a second end thereof. Optionally, a second spring 1215b is preferably fixed to the plate 1220 at a first end thereof and is preferably fixed to the plate 1225 at a second end thereof.

In the undeflected position shown in FIG. 12, preferably neither of the springs 1215a, 1215b impose a substantial force on the biasing member 1210. As the actuator 1230 advances from the undeflected position, the spring imposes an increasing advancing force on the biasing member 1220 (e.g., generally toward the rocker 95). As the actuator 1230 retracts from the undeflected position, the spring imposes an increasing retracting force on the biasing member 1220 (e.g., generally away from the rocker 95).

In operation, when a component of force transmitted from the actuator 1230 (e.g., via the spring 1215a of the biasing mechanism illustrated in FIG. 12) to the rocker 95 exceeds an oppositely acting force of the rocker 95 on the gauge wheel arm (or on the depth adjustment member if the rocker is already contacting the depth adjustment member), the depth adjustment member 1210 preferably advances, forcing the rocker 95 farther away from the gauge wheel arm and reducing the furrow depth. It should be appreciated that the biasing force may be built up gradually by extension of the actuator 1230 without being sufficient to advance the depth adjustment member 1210 until sufficient extension of the actuator or until reduction of downforce.

Figure 14:
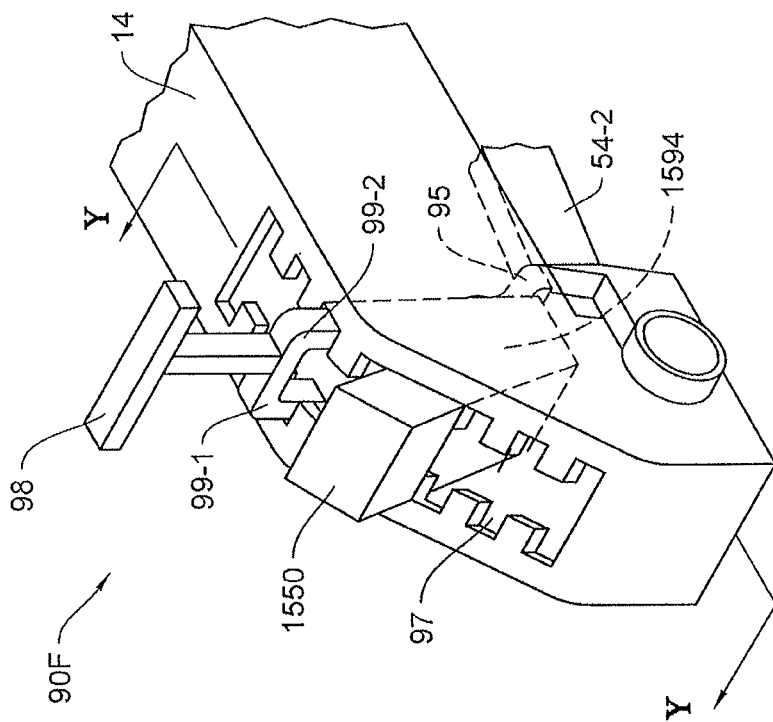
FIG. 14 is a perspective view of another embodiment of a depth adjustment assembly and a secondary depth adjustment assembly disposed on the row unit frame.
Figure 13:
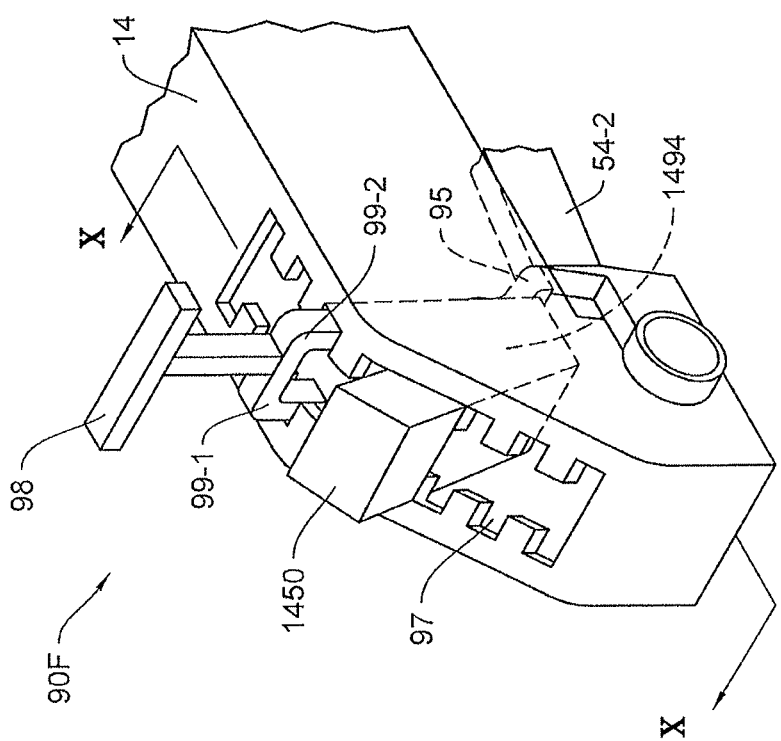
FIG. 13 is a perspective view of another embodiment of a depth adjustment assembly and a secondary depth adjustment assembly disposed on the row unit frame.

FIGS. 13 and 14 are perspective views of a row unit frame 14 showing alternative embodiments of depth adjustment assemblies 90F and 90G, respectively, disposed on the row unit 14.

Figure 13A:
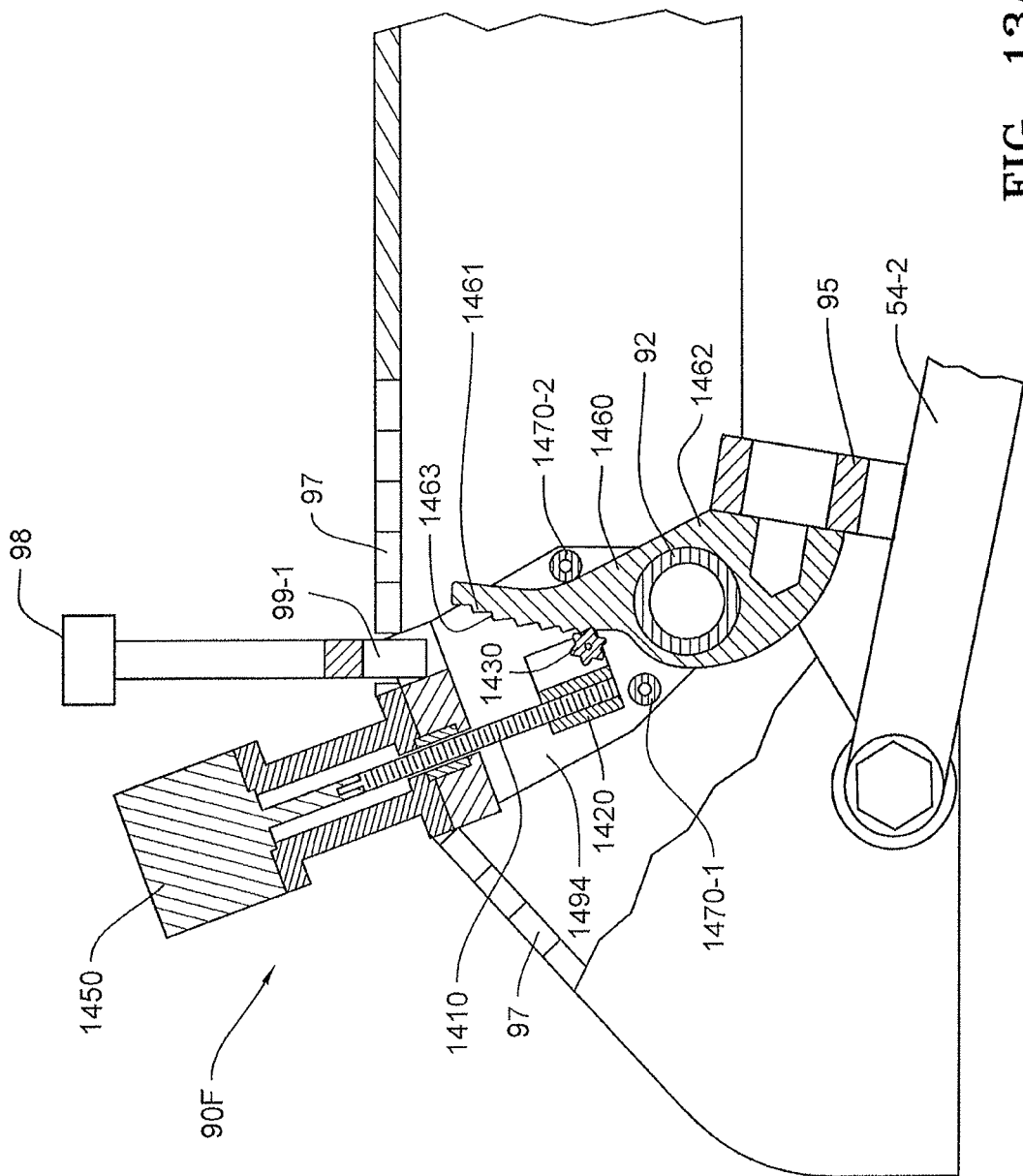
FIG. 13A is a side elevation view of the depth adjustment assembly and a secondary depth adjustment assembly of FIG. 13 as viewed along lines X-X of FIG. 13.
Figure 13B:
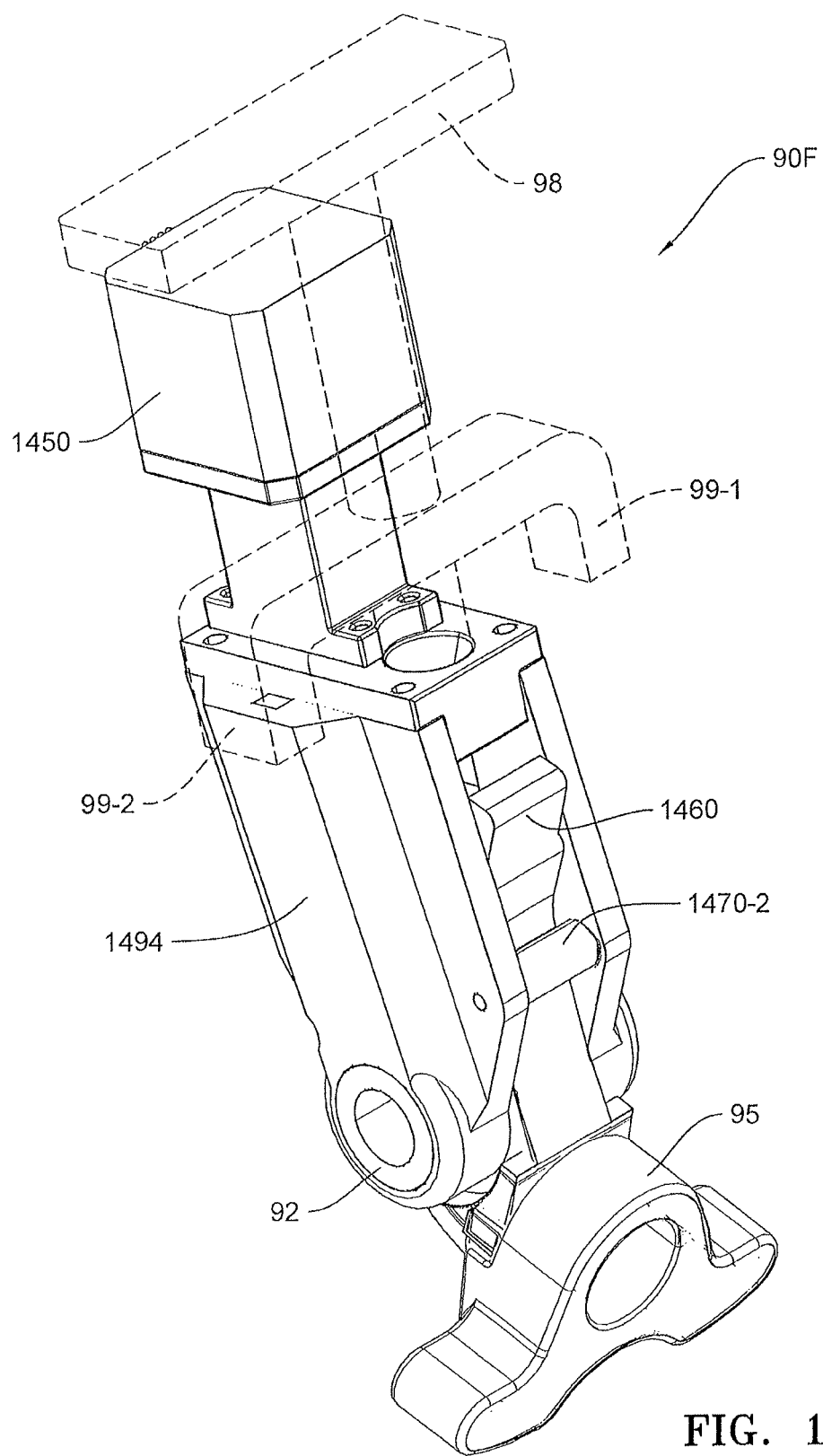
FIG. 13B is an enlarged perspective view of the depth adjustment assembly and a secondary adjustment assembly of FIG. 13 with the row unit frame removed.

Referring to FIG. 13A, a side elevation view of depth adjustment assembly 90F is shown as viewed along lines X-X of FIG. 13. FIG. 13B is an enlarged perspective view of depth adjustment assembly 90F with the row unit frame 14 removed and the handle 98 shown in dashed lines for clarity.

The depth adjustment assembly 90F includes a housing 1494 which is received between the sidewalls of the row unit frame 14. The housing 1494 is adjustably positionable along the depth adjustment slots 97 of the row unit frame 14 by engagement of the handle 98 within one of the plurality of depth adjustment slots 97 to achieve the initial preselected furrow depth. The handle 98 includes hooks 99-1, 99-2 which extend into the slots 97, thereby positioning the housing 1494 at the desired slot 97.

The secondary depth adjustment assembly of the depth adjustment assembly 90F comprises a drive motor 1450, drive screw 1410, drive member 1420, cam arm 1460 and cog 1430, all of which cooperate to adjustably position the rocker 95 with respect to the row unit frame 14 as hereinafter described.

As shown in FIG. 13A, the drive screw 1410 extends into the housing 1494 and is driven by the drive motor 1450. The drive screw 1410 is threadably received by the drive member 1420. The cog 1430 is rotatably disposed on drive member 1420. A cam arm 1460 has a proximal end 1461 and a distal end 1462. The distal end 1462 of the cam arm 1460 is pivotably mounted about pivot 92. The proximal end 1461 of the cam arm 1460 includes teeth 1463 that engage with the cog 1430. The rocker 95 is pivotally attached to the distal end 1462 of the cam arm 1460. Stops 1470-1 and 1470-2 may be disposed in the housing 1494 on either side of cam arm 1460 to limit the rotational movement of cam arm 1460 in both the clockwise and counterclockwise rotation.

In operation, drive motor 1450 rotates the drive screw 1410 causing the drive member 1420 threadably attached thereto to be threaded upwardly or downwardly along the drive screw 1410 such that it is raised and lowered within the housing 1494. If the drive screw 1410 is rotated by the drive motor 1450 in the direction to cause the drive member 1420 to be threaded upwardly along the drive screw 1410, the cog 1430 engages with the teeth 1463 of the cam arm 1460 causing the cam arm 1460 to pivot counterclockwise (as shown in FIG. 13A) about pivot 92, which raises the rocker 95 with respect to the row unit frame 14, permitting the gauge wheel arms 54 to raise with respect to the frame member 14, thereby increasing the furrow depth. Conversely, if the drive screw 1410 is rotated by the drive motor 1450 in the opposite direction to cause the drive member 1420 to be threaded downwardly along the drive screw 1410, the cog 1430 engages with the teeth 1463 of the cam arm 1460 causing the cam arm 1460 to pivot clockwise (as shown in FIG. 13A) about pivot 92, which forces the rocker 95 lower with respect to the frame member 14, thereby forcing the gauge wheel arms 54 downwardly with respect to the frame member 14 and, in turn, decreasing the furrow depth.

Figure 14A:
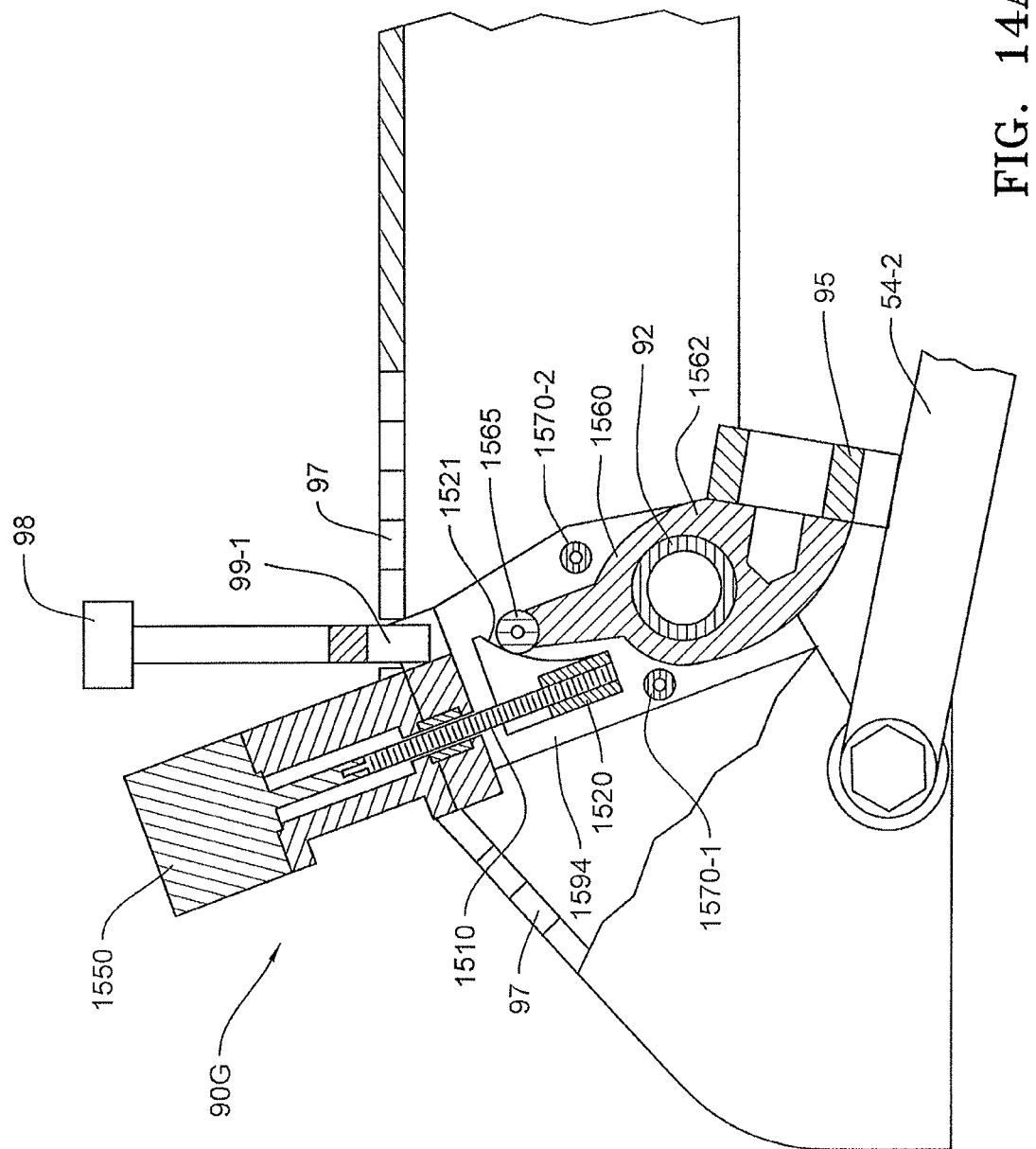
FIG. 14A is a side elevation view of the depth adjustment assembly and a secondary depth adjustment assembly of FIG. 14 as viewed along lines Y-Y of FIG. 14.

Referring to FIG. 14A, a side elevation view of depth adjustment assembly 90G is shown as viewed along lines Y-Y of FIG. 14. Similar to the embodiment of 90F, the depth adjustment assembly 90G includes a housing 1594 which is received between the sidewalls of the row unit frame 14. The housing 1594 is adjustably positionable along the depth adjustment slots 97 of the row unit frame 14 by engagement of the handle 98 within one of the plurality of depth adjustment slots 97 to achieve the initial preselected furrow depth. The handle 98 includes pegs 1593 which extend into the slots 97 thereby securing the housing 1594 at the desired slot 97.

Figure 14B:
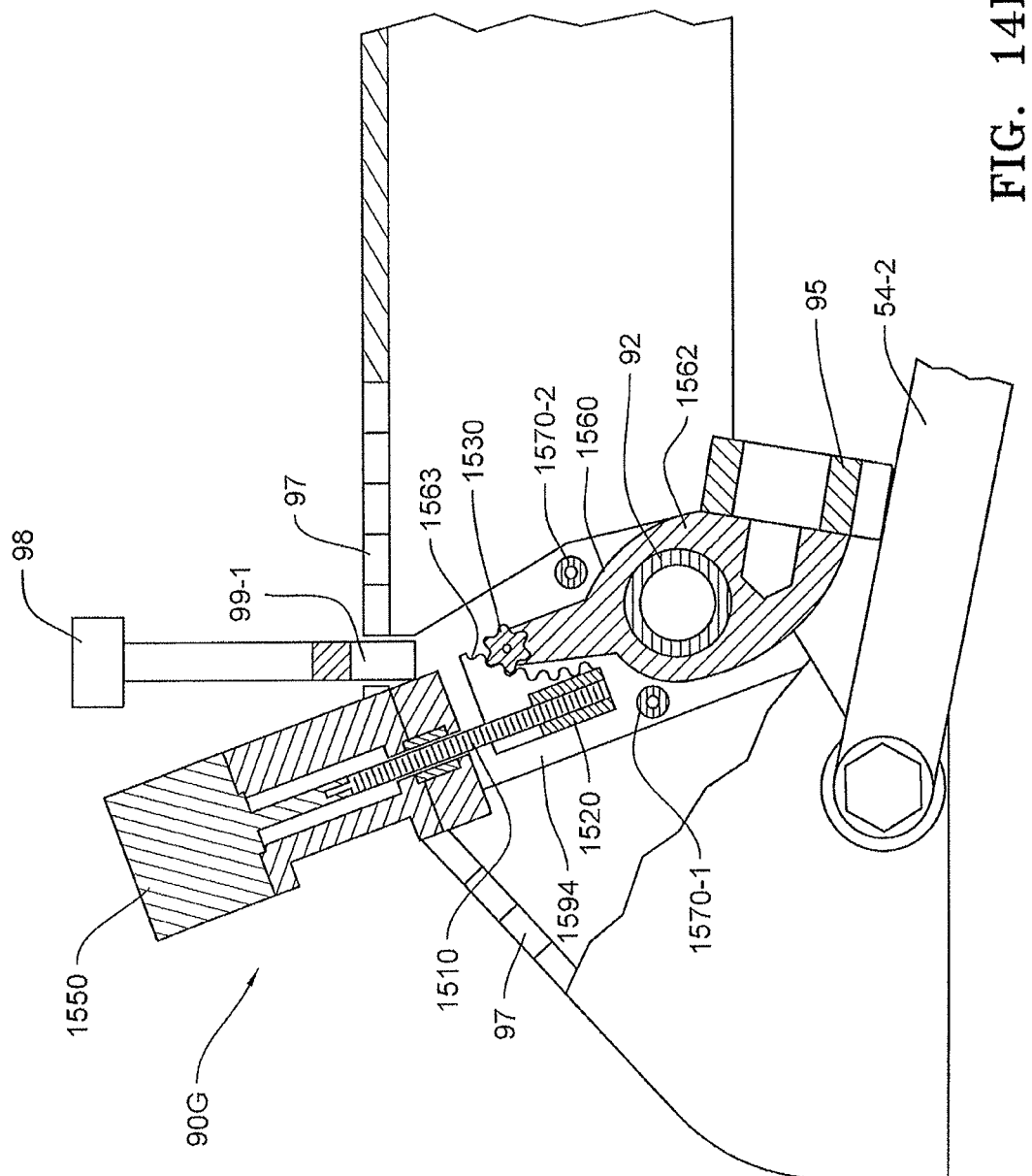
FIG. 14B is a side elevation view of the depth adjustment assembly and a secondary depth adjustment assembly of FIG. 14 showing an alternative embodiment in which the roller replaced with a cog.

The secondary depth adjustment assembly of the depth adjustment assembly 90G comprises a drive motor 1550, drive screw 1510, drive member 1520, cam arm 1560 and a roller 1565 (FIG. 14A) or a cog 1530 (FIG. 14B), which cooperate to adjustably position the rocker 95 with respect to the row unit frame 14 as hereinafter described.

As shown in FIG. 14A, the drive screw 1510 extends into the housing 1594 and is driven by a drive motor 1550. The drive screw 1410 is threadably received by drive member 1520. The drive member 1520 has a sloped side 1521 that engages with a roller 1565 rotatably attached to a proximal end 1561 of the cam arm 1560. A distal end 1562 of the cam arm 1560 is pivotably mounted about pivot 92. The rocker 95 is pivotally attached to the distal end 1562 of the cam arm 1560. In an alternative embodiment shown in FIG. 14B, roller 1565 is be replaced with a rotatable cog 1530 and the sloped side 1521 includes teeth 1563 which engage with the cog 1530 as the cog 1530 rotates. Stops 1570-1 and 1570-2 may be disposed in the housing 1594 on either side of cam arm 1560 to limit the rotational movement of cam arm 1560 in both the clockwise and counterclockwise rotation.

In operation, the drive motor 1550 rotates the drive screw 1510 causing the drive member 1520 threadably attached thereto to be threaded upwardly or downwardly along the drive screw 1410 such that it is raised and lowered within the housing 1594. If the drive screw 1510 is rotated by the drive motor 1550 in the direction to cause the drive member 1520 to be threaded upwardly along the drive screw 1510, the roller 1565 will roll downwardly along the sloped side 1521 causing the cam arm 1560 to pivot counterclockwise (as shown in FIG. 14A) about pivot 92, which raises the rocker 95 with respect to the row unit frame 14, permitting the gauge wheel arms 54 to raise with respect to the frame member 14, thereby increasing the furrow depth. Conversely, if the drive screw 1510 is rotated by the drive motor 1550 in the opposite direction to cause the drive member 1520 to be threaded downwardly along the drive screw 1510, the roller 1565 will roll along the curved surface 1521 causing the cam arm 1560 to pivot clockwise (as shown in FIG. 14A) about pivot 92, which forces the rocker 95 lower with respect to the frame member 14, thereby forcing the gauge wheel arms 54 downwardly with respect to the frame member 14 and, in turn, decreasing the furrow depth. It should be appreciated that with respect to the embodiment shown in FIG. 14B, wherein the roller 1565 and sloped surface 1521 are replaced with the cog 1530 which engage teeth 1563 on the sloped surface 1521, the same action is accomplished.

In an alternative embodiment to any of embodiments 90A, 90B, 90C, 90D, 90E, 90F, and 90G, the depth adjustment body 94, 1494, or 1594 does not need to be adjustable. Depth adjustment body 94, 1494, or 1594 can remain fixed with respect to frame 14 and the secondary adjustment assembly of any of embodiments 90A, 90B, 90C, 90D, 90E, 90F, and 90G will provide the entire range of depth adjustment. Instead of pivoting at pivot 92, depth adjustment body 94, 1494 or 1594 is fixed to frame 14.

Any of the actuators (720, 800, 950, 1000, 1230) can be electrical, hydraulic, or pneumatic actuators.

Figure 15:
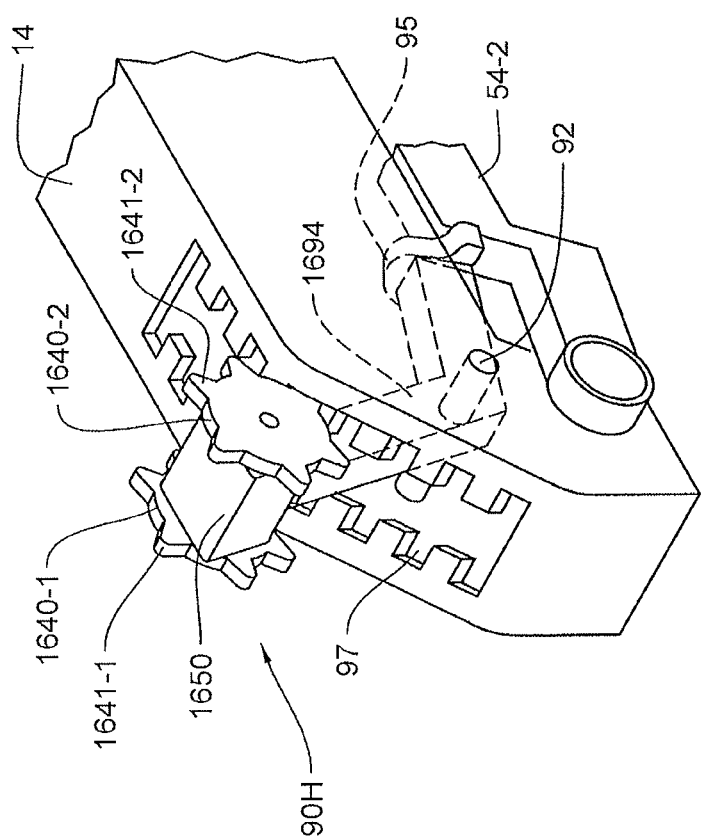
FIG. 15 is a perspective view of another embodiment of a depth adjustment assembly with a rotary actuator disposed on the row unit frame.
Figure 15A:
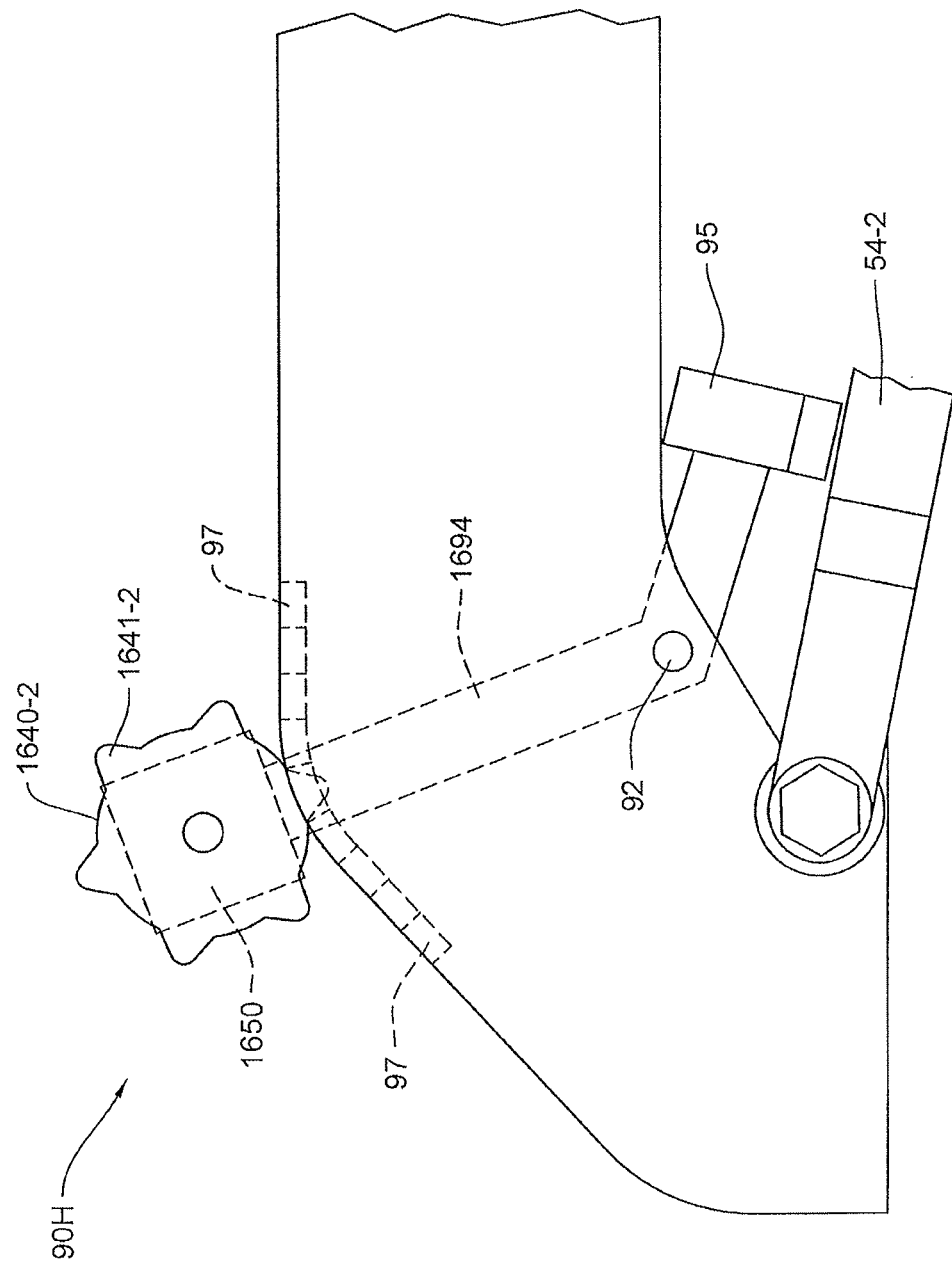
FIG. 15A is a side elevation view of the depth adjustment assembly of FIG. 15.

FIGS. 15 and 15A illustrate another embodiment of a depth adjustment assembly 90H in which a rotary actuator 1650 (such as an electric motor) turns gears 1640-1 and 1640-2 that adjusts the position of the depth adjustment body 1694 relative to the depth adjustment slots 97. Gears 1640-1 and 1640-2 have teeth 1641-1 and 1641-2, respectively that engage in slots 97. Rotary actuator 1650 is connected to depth adjustment body 1694, which is pivotally mounted to the frame 14 at pivot 92. Rocker 95 is pivotally mounted to the depth adjustment body 1694. Rotary actuator may be gear reduced (such as 300:1) to allow for smaller rotation of gears 1640-1 and 1640-2. In this embodiment, rotary actuator 1650 replaces handle 98. This embodiment can be used as the only depth adjustment assembly, or it can be used as the primary depth adjustment assembly and used in combination with any of the other secondary depth adjustment assemblies.

Figure 15B:
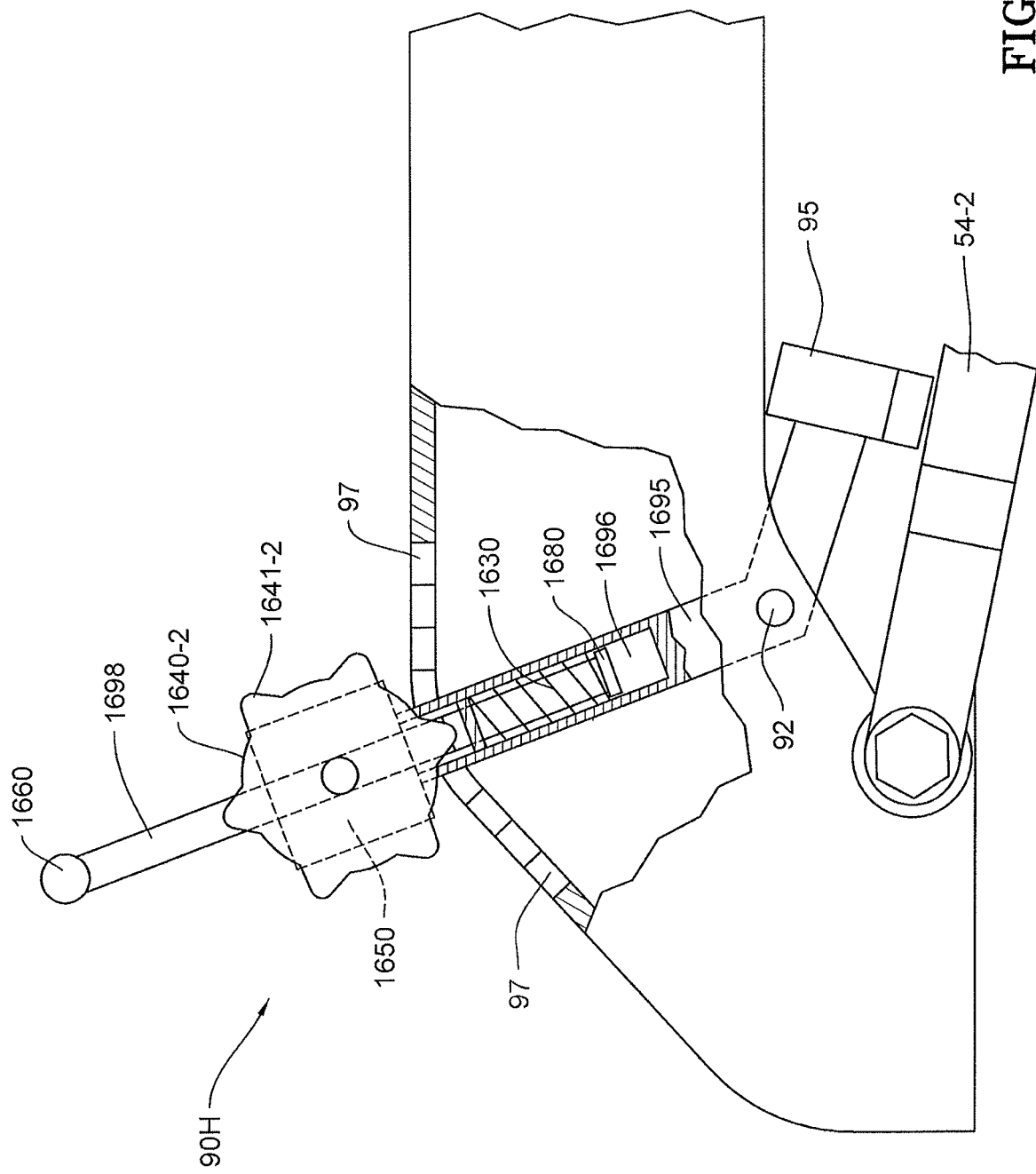
FIG. 15B is a side elevation view of the depth adjustment assembly of FIG. 15A including a manual adjustment.

FIG. 15B illustrates an alternative embodiment of a depth adjustment assembly 90H in which depth adjustment body 1694 is replaced with depth adjustment body 1695, handle shaft 1698, and spring 1630. Handle shaft 1698 is attached to actuator 1650 and is partially slidingly received within a cavity 1696 of the depth adjustment body 1695. The spring 1630 engages an annular lip 1680 disposed on the bottom end of the handle shaft 1698. The spring 1630 thus imposes a resilient force to retain the gears 1640 in the selected slot 97 but permits the user to withdraw the actuator 1650 using handle 1660 attached to actuator 1650 to temporarily disengage the gears 1640 from the slot 97 to a desired pre-set depth to minimize the amount of travel that the actuator 1650 needs to reach a selected depth.

Figure 16A:
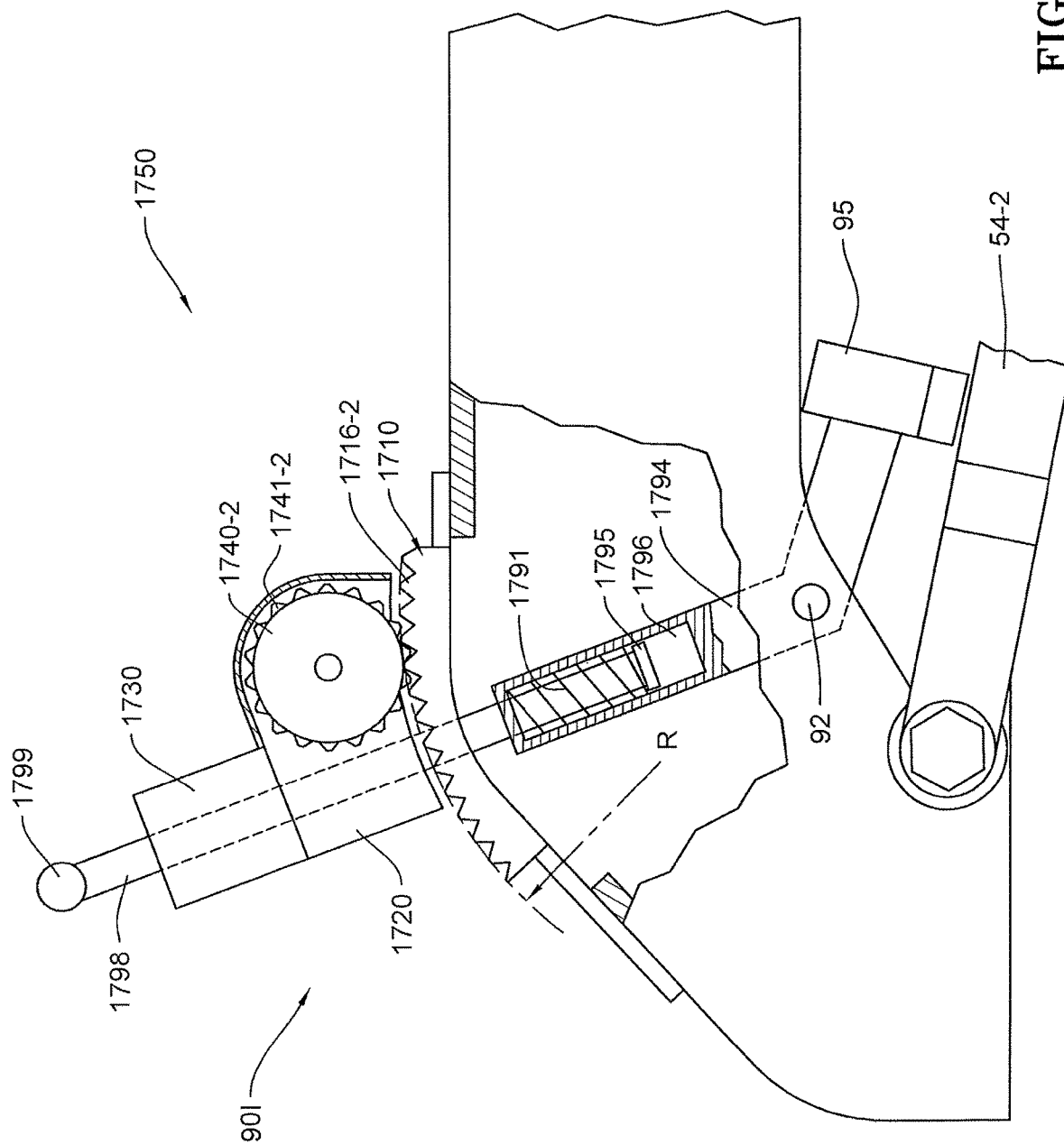
FIG. 16A is a side elevation and partial cutaway view of the depth adjustment assembly of FIG. 16.

FIGS. 16 and 16A illustrate another embodiment of a depth adjustment assembly 90I in which a gear rack 1710 is disposed on row unit 14 over depth adjustment slots 97. A radius R from pivot 92 to gear rack 1710 remains constant along the gear rack 1710 having two rows of teeth 1716-1, 1716-2. Rotary actuator 1750 is disposed over gear rack 1710 and is connected to a handle shaft 1798 at gear box 1720. Rotary actuator 1750 includes a motor 1730 connected to a gear box 1720. In the rear perspective view of FIG. 16, the rotary actuator 1750 is removed for clarity to better show the gear rack 1710. Gear box 1720 has gears 1740 having teeth 1741 for meshing with gear rack 1710. Only one of the gears is visible in FIG. 16A, but it should be appreciated that respective gears 1740-1, 1740-2, having respective teeth 1741-1, 1741-2 would rotatably engage with respective teeth 1716-1, 1716-2 of gear rack 1710. A handle 1799 can be disposed on motor 1730 to permit rotary actuator 1750 to disengage from gear rack 1710 for moving to a different position on gear rack 1710 to preset a selected depth. Rotary actuator 1740 may be gear reduced (such as 300:1) to allow for smaller rotation of gears 1740-1 and 1740-2. In this embodiment, rotary actuator 1750 replaces handle 98 described in the previous embodiments. Handle shaft 1798 is attached to actuator 1750 at gear box 1720 and is partially slidingly received within a cavity 1796 of a depth adjustment body 1794. A spring 1791 engages an annular lip 1795 disposed on the bottom end of the handle shaft 1798. The spring 1791 imposes a resilient force to retain the gears 1740 meshed with gear rack 1710 but permits the user to withdraw the actuator 1750 using handle 1799 attached to actuator 1750 to temporarily disengage the gears 1740 from gear rack 1710. Depth adjustment body 1794 is pivotally mounted to the frame 14 at pivot 92. Rocker 95 is pivotally mounted to the depth adjustment body 1794.

Figure 16B:
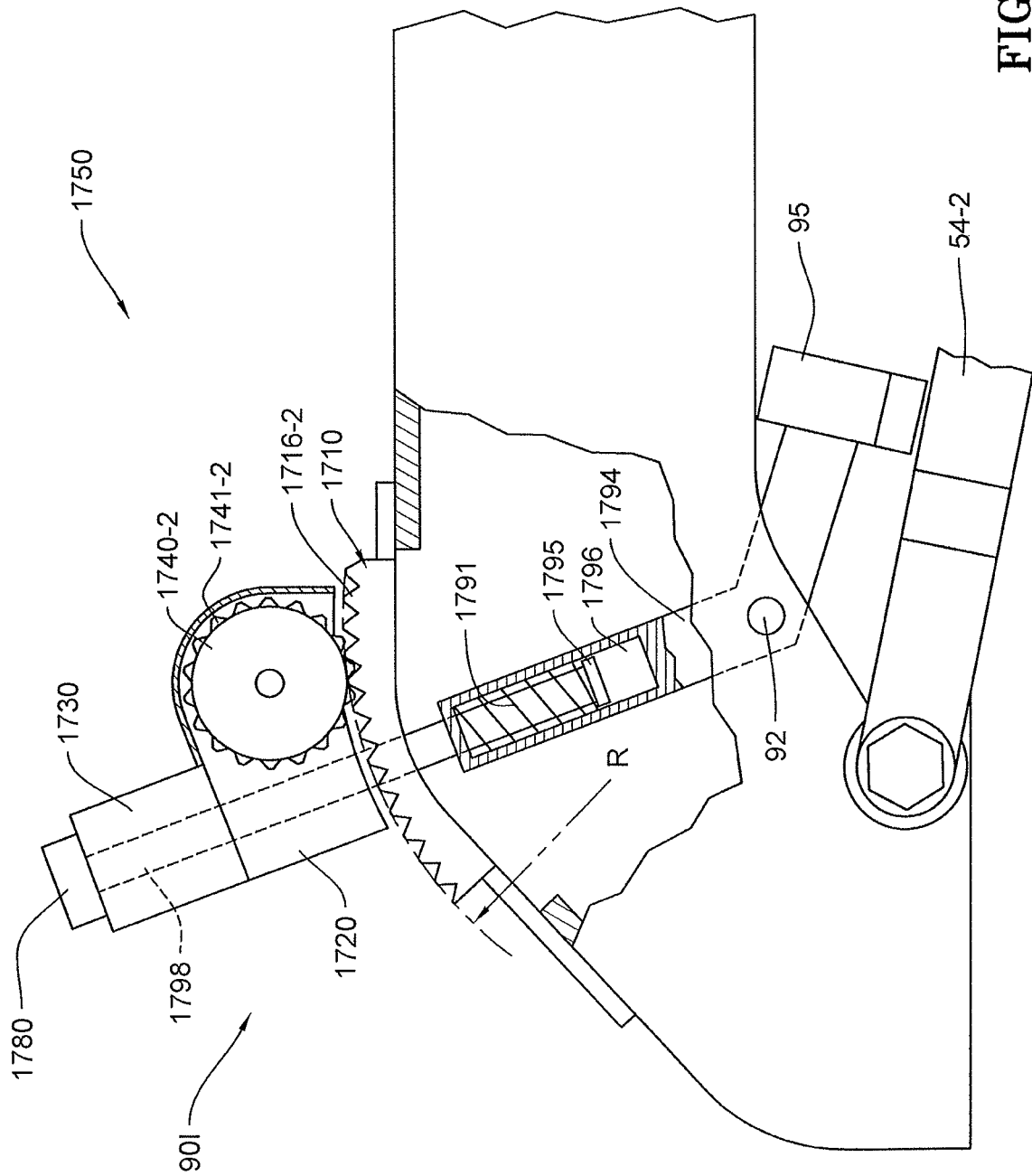
FIG. 16B is a side elevation and partial cutaway view of another embodiment for the depth adjustment assembly of FIG. 16.

FIG. 16B illustrates an alternative embodiment of the depth adjustment assembly 90I in which handle 1799 is replaced with manual adjustment 1780. Manual adjustment 1780 may be a knob, a bolt head or other suitable means to permit a user to manually move motor 1730 by hand or a tool to adjust depth adjustment assembly 90I when motor 1730 cannot be driven electrically.

Figure 16C:
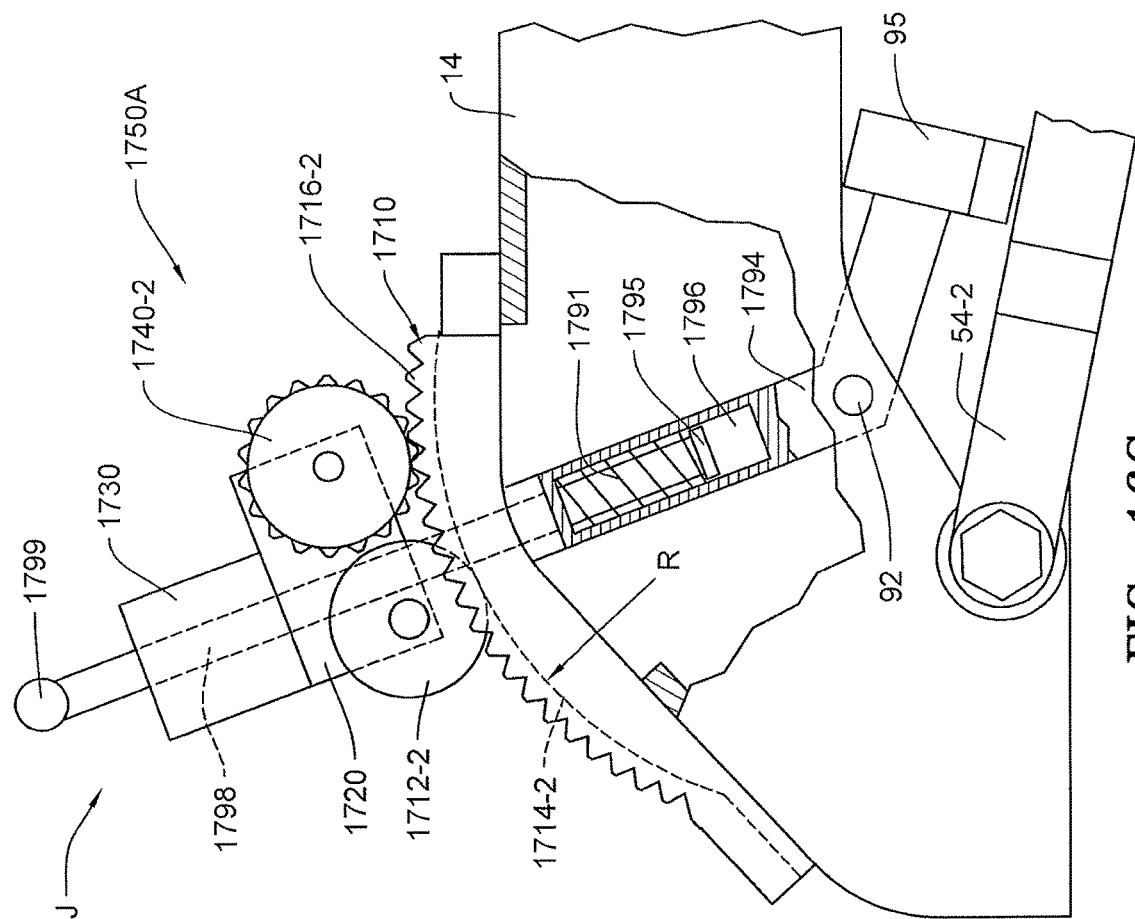
FIG. 16C is a side elevation and partial cutaway view of another embodiment for the depth adjustment assembly of FIG. 16
Figure 16D:
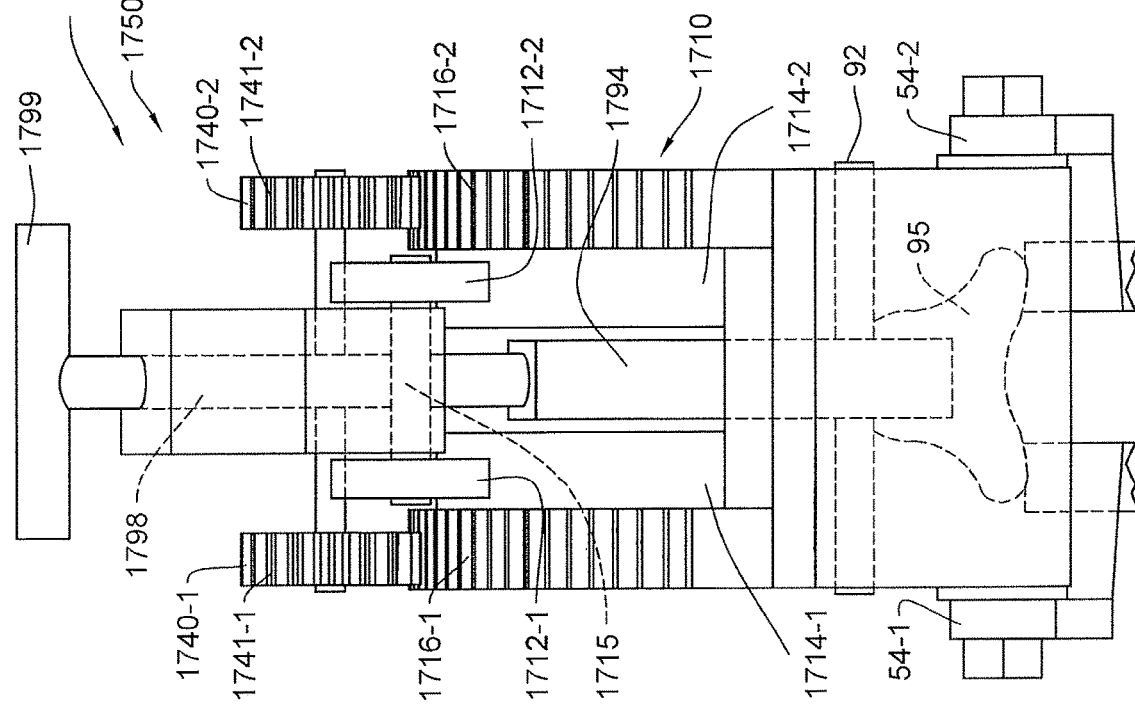
FIG. 16D is a rear elevation view of the embodiment of FIG. 16C.
Figure 16E:
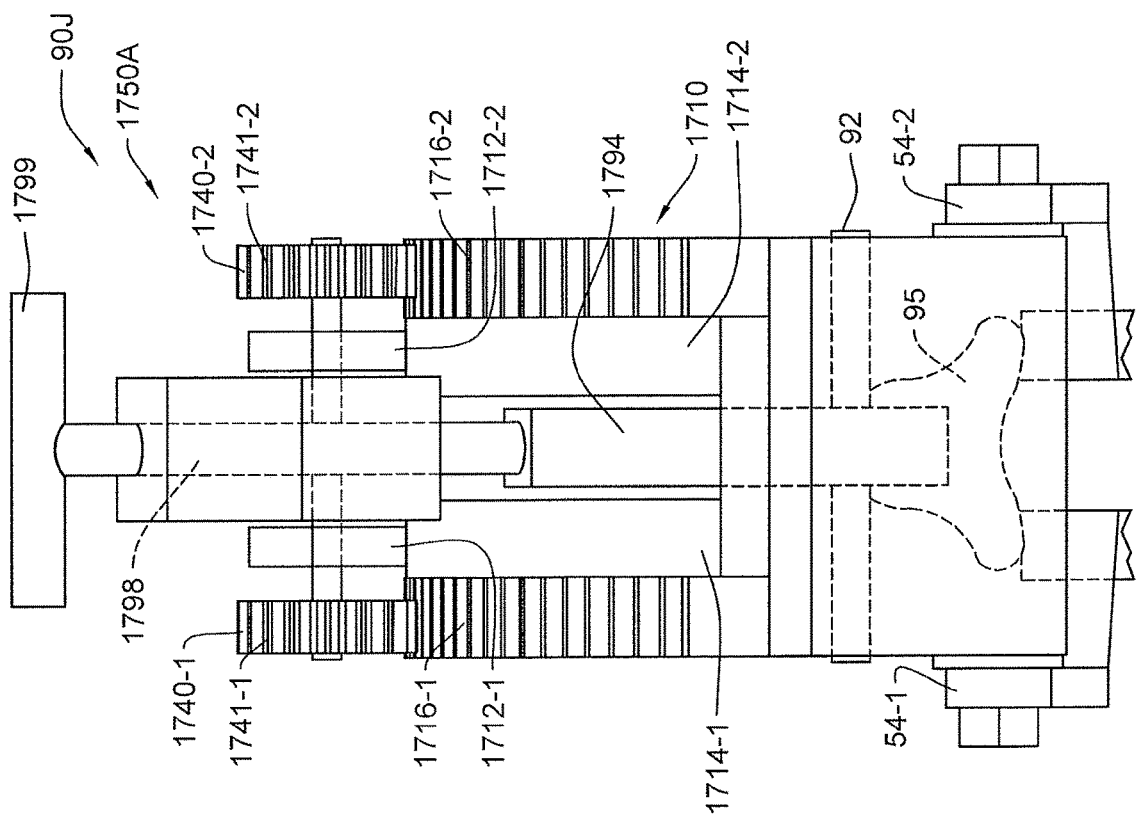
FIG. 16E is a rear elevation view of another embodiment for a depth adjustment assembly.

FIG. 16C is a side elevation and partial cutaway view of another embodiment of a depth adjustment assembly 90J that further includes a rotary actuator 1750A. FIG. 16D is a rear elevation view of the embodiment of 16C. In this embodiment, gear rack 1710 includes shelves 1714-1 and 1714-2 laterally inward of respective teeth 1716-1 and 1716-2. Rollers 1712-1 and 1712-2 are secured to an axle 1715 extending through gearbox 1720. The rollers 1712-1 and 1712-2 ride on the respective shelves 1714-1 and 1714-2. The force on gears 1740-1 and 1740-2 from spring 1791 is reduced because the force is acting through rollers 1712-1 and 1712-2 on shelves 1714-1 an 1714-2, thus allowing for easier movement of gears 1740-1 and 1740-2 on teeth 1716-1 and 1716-2. Also, it is easier to maintain center distance for gear mesh. Similar to FIG. 16B, handle 1799 can be replaced with manual adjustment 1780. In another embodiment shown in FIG. 16E, rollers 1712-1 and 1712-2 are coaxial with gears 1740-1 and 1740-2. This simplifies the embodiment shown in FIGS. 16C and 16D to permit the depth adjustment assembly 90J to have a full range of motion across teeth 1716.

Figure 17:
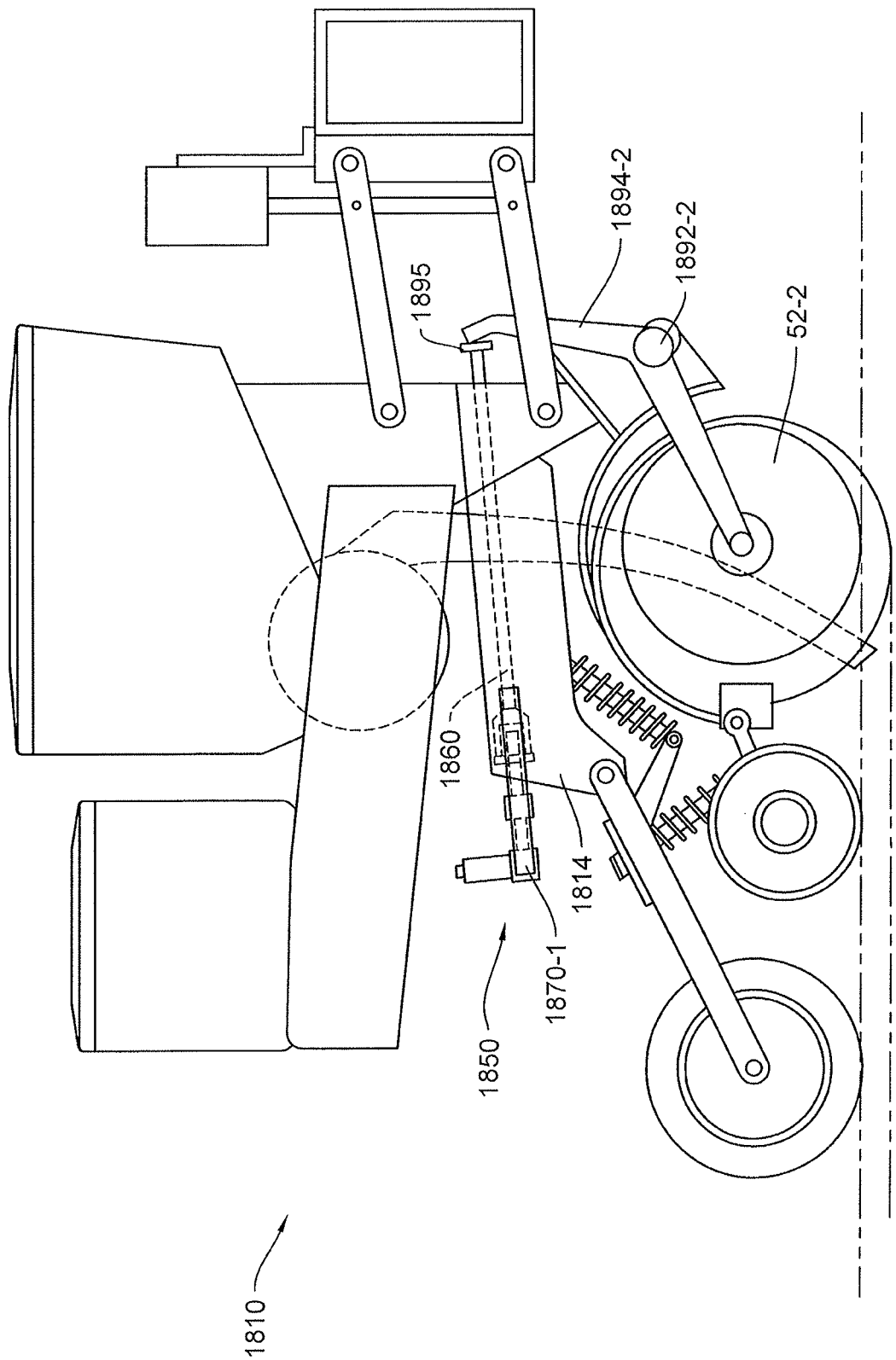
FIG. 17 is a side elevation view showing a Case row unit adapted with another embodiment of a depth adjustment assembly.
Figure 17A:
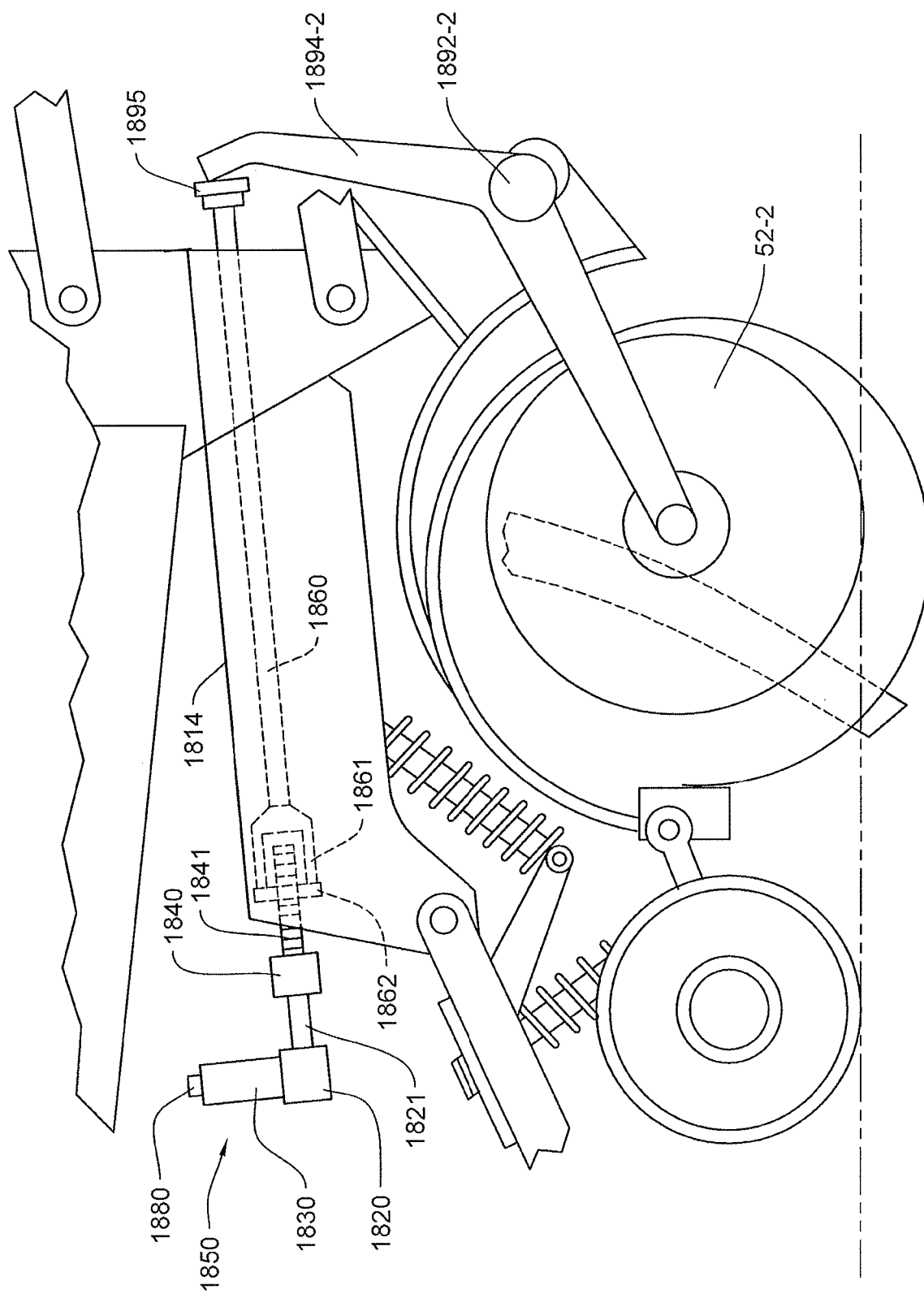
FIG. 17A is an enlarged view of the embodiment of FIG. 17.

FIG. 17 is a side elevation view of a conventional Case row unit 1814 such as disclosed in U.S. Pat. No. 6,827,029 (the "Case '029 patent"), incorporated herein by reference, which is adapted with another embodiment of a depth adjustment assembly 90K, as hereinafter described. FIG. 17A is an enlarged partial view of FIG. 17. The conventional Case row unit includes an adjustment handle (identified by reference numeral 90 in FIG. 2 of the Case '029 patent) which is removed and replaced with an actuator 1850 coupled to a screw 1841 that engages with the rod 1860 (corresponding to rod 92 in FIG. 2 of the Case '029 patent). The depth adjustment assembly 90K is mounted to row unit 1810 via bracket 1870 having bracket arms 1870-1 and 1871-2 attached to channel member 1814. Actuator 1850 includes motor 1830 and gear box 1820, which drives shaft 1821, which is coupled to screw 1841 via coupler 1840. Screw 1841 is threadably engaged with adjustment arm 1860 extending through the channel member 1814. Adjustment arm 1860 has a screw receiver end 1861 having a threaded nut 1862 for threadably receiving screw 1841. Adjustment arm 1860 extends through channel member 1814 and is connected to a rocker 1895 at its distal end. The rocker 1895 is pinned to the distal end of the adjustment arm 1860 and acts on respective gauge wheel arms 1894-1 and 1894-2. Gauge wheel arms 1894-1 and 1894-2 are pivotally connected to a frame member of the row unit 1810 via pivots 1892-1 and 1892-2, respectively. Gauge wheels 52-1 and 52-2 are connected to gauge wheel arms 1894-1 and 1894-2, respectively.

For any of the depth adjustment assemblies that have a motor as part of their actuator (1450, 1550, 1650, 1750, 1850, 1950), the set depth can be determined by the actuator/motors 1450, 1550, 1650, 1730, 1830, 1930, 1984 based on their rotations in either direction. If actuator/motors 1450, 1550, 1650, 1730, 1830, 1930, 1984 are stepper motors, the number of steps taken in either direction can be tracked by depth control and soil monitoring system 300.

Figures 18, 18A:
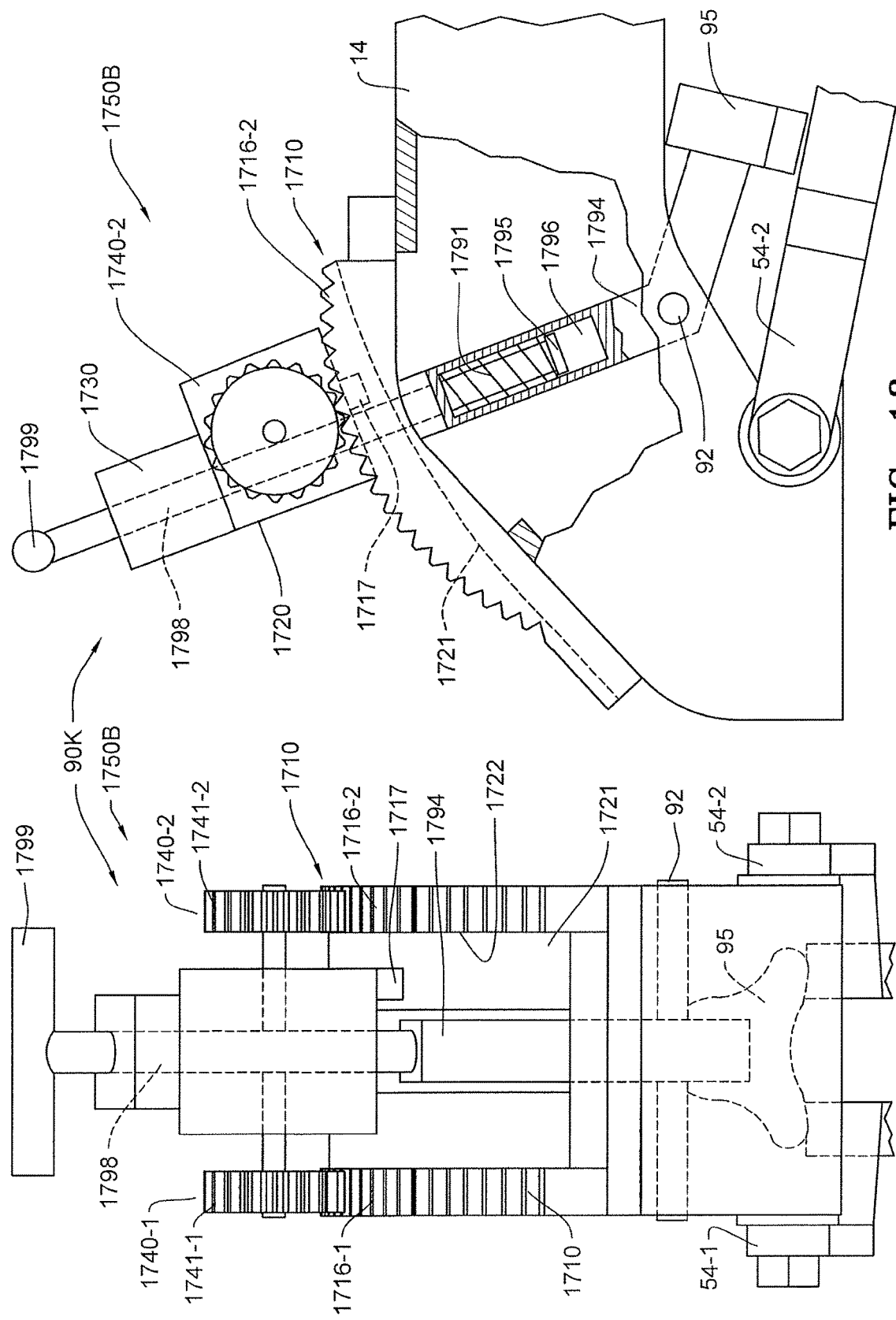
FIG. 18 is a side elevation and partial cutaway view of another embodiment of a depth adjustment assembly with a position location system.
FIG. 18A is rear elevation view of the embodiment of FIG. 18.

FIGS. 18 and 18A illustrate another embodiment of a depth adjustment assembly 90K utilizing a gear rack 1710 and a distance sensor 1717 to determine the position of the actuator 1750B along the gear rack 1710. FIG. 18A is a rear elevation view of FIG. 18. In this embodiment, the distance sensor 1717 is disposed on the bottom of gear box 1720 and is disposed over a ledge 1721 disposed on an interior surface 1722 of gear rack 1710. In this embodiment, ledge 1721 has a constantly changing distance with respect to the constant radius of teeth 1716. Sensing this change in distance, distance sensor 1717 communicates with depth control and soil monitoring system 300.

Figure 19:
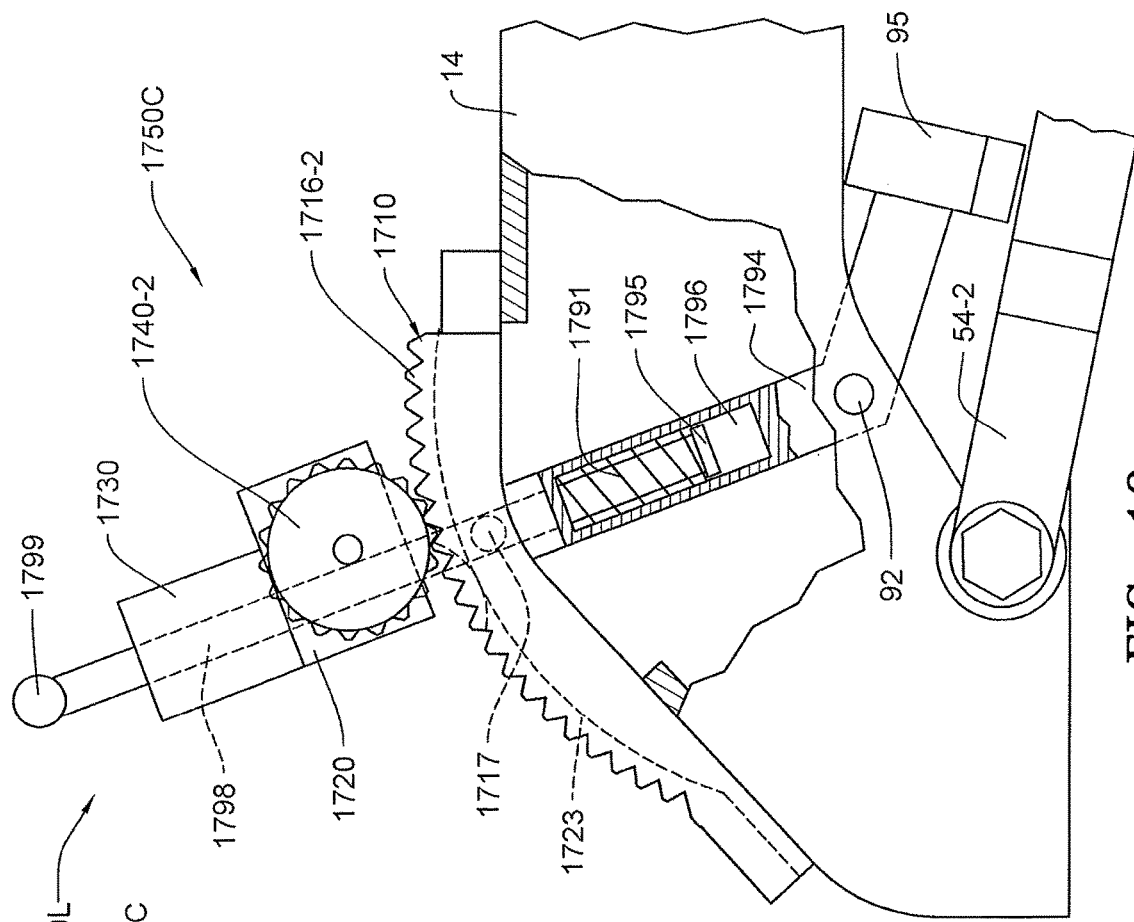
FIG. 19 is a side elevation and partial cutaway view of another embodiment of a depth adjustment assembly with a position location system.
Figure 19A:
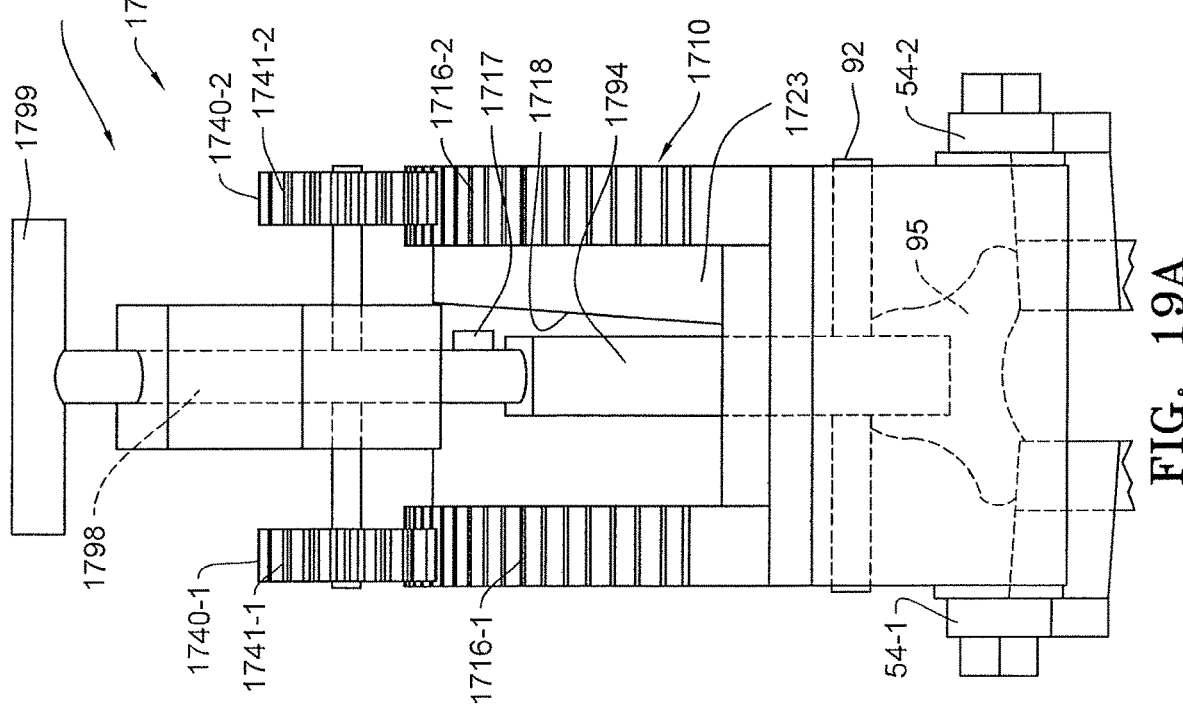
FIG. 19A is rear elevation view of the embodiment of FIG. 19.

FIGS. 19 and 19A illustrate another embodiment of a depth adjustment assembly 90L utilizing a gear rack 1710 and a distance sensor 1717 to determine the position of the actuator 1750C along the gear rack 1710. FIG. 19A is a rear elevation view of FIG. 19. In this embodiment, the distance sensor 1717 is disposed on the handle shaft 1798. The interior wall 1718 of ledge 1723 adjacent to the distance sensor 1717 has a constantly changing width transverse to the direction of travel of handle shaft 1798. The change in distance to the interior wall 1718 is sensed by the distance sensor 1717 which communicates with depth control and soil monitoring system 300.

Distance sensor 1717 can be any sensor that can measure distance. Examples of distance sensors include, but are not limited to Hall effect sensors and inductive sensors.

FIGS. 20A to 20K illustrate another embodiment of a depth adjustment assembly 90M utilizing a gear rack 1910 and a distance sensor 1917 to determine the position of actuator 1950 along the gear rack 1910. In this embodiment, the distance sensor 1917 is disposed above ledge 1921, which is disposed on gear rack 1910. In one embodiment, distance sensor 1917 is attached to gear box 1920. In this embodiment, ledge 1921 has a constantly changing distance with respect to the constant radius of teeth 1916. Sensing this change in distance, distance sensor 1917 communicates with depth control and soil monitoring system 300. Alternatively, gear rack 1910 can have an interior wall similar to interior wall 1718 on gear rack 1710 with distance sensor disposed to sense the change in distance to the interior wall (not shown).

Depth adjustment assembly 90M has actuator 1950 disposed on and engaged with gear rack 1910. Actuator 1950 has an electric motor 1930 connected to and driving gear box 1920. Gear box 1920 drives gears 1940-1 and 1940-2. Gears 1940-1 and 1940-2 have teeth 1941-1 and 1941-2, respectively, for engaging teeth 1916 (1916-1 and 1916-2) on gear rack 1910.

Figure 20A:
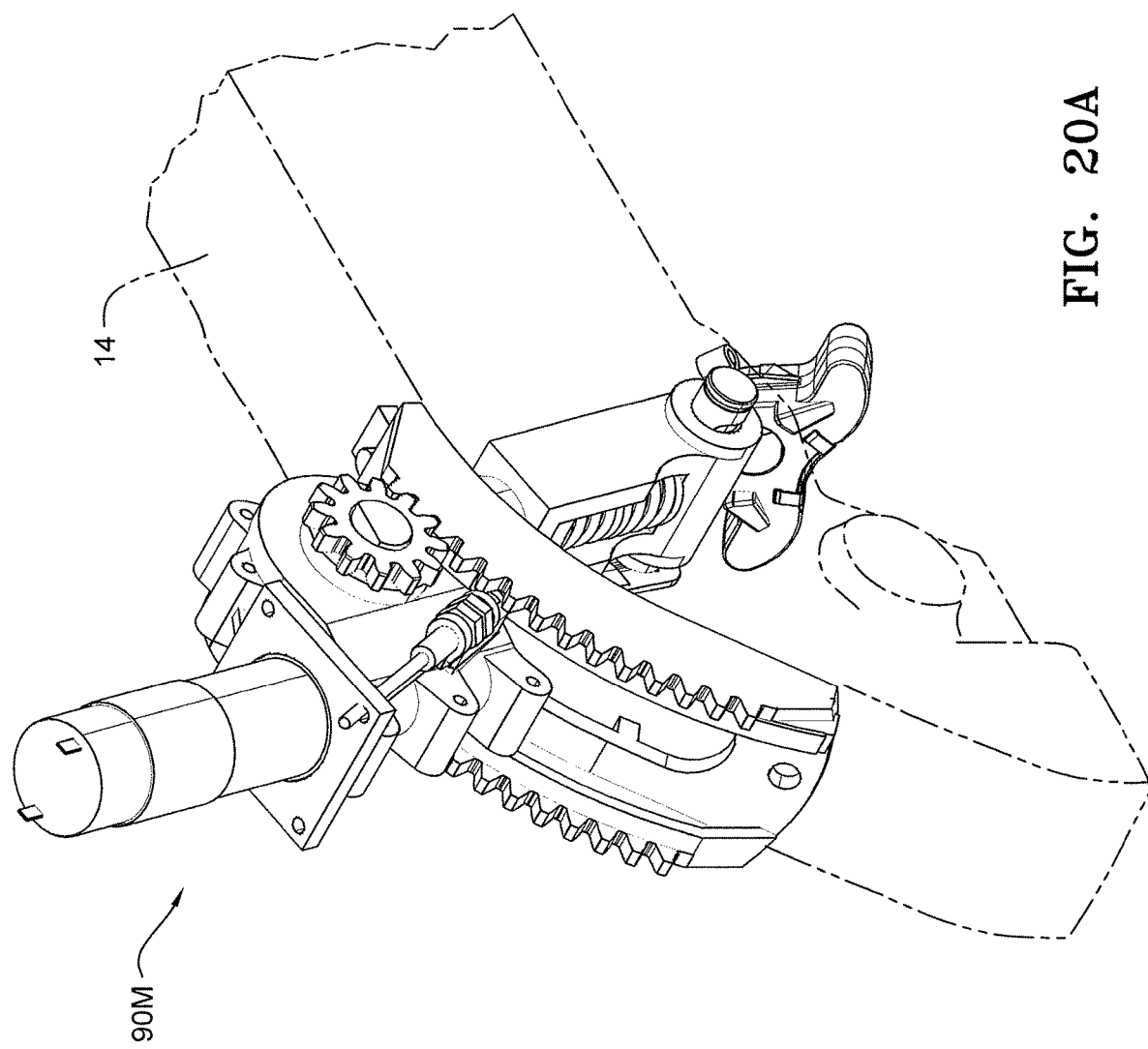
FIG. 20A is a side elevation and partial cutaway view of another embodiment of a depth adjustment assembly with a position location system.
Figure 20B:
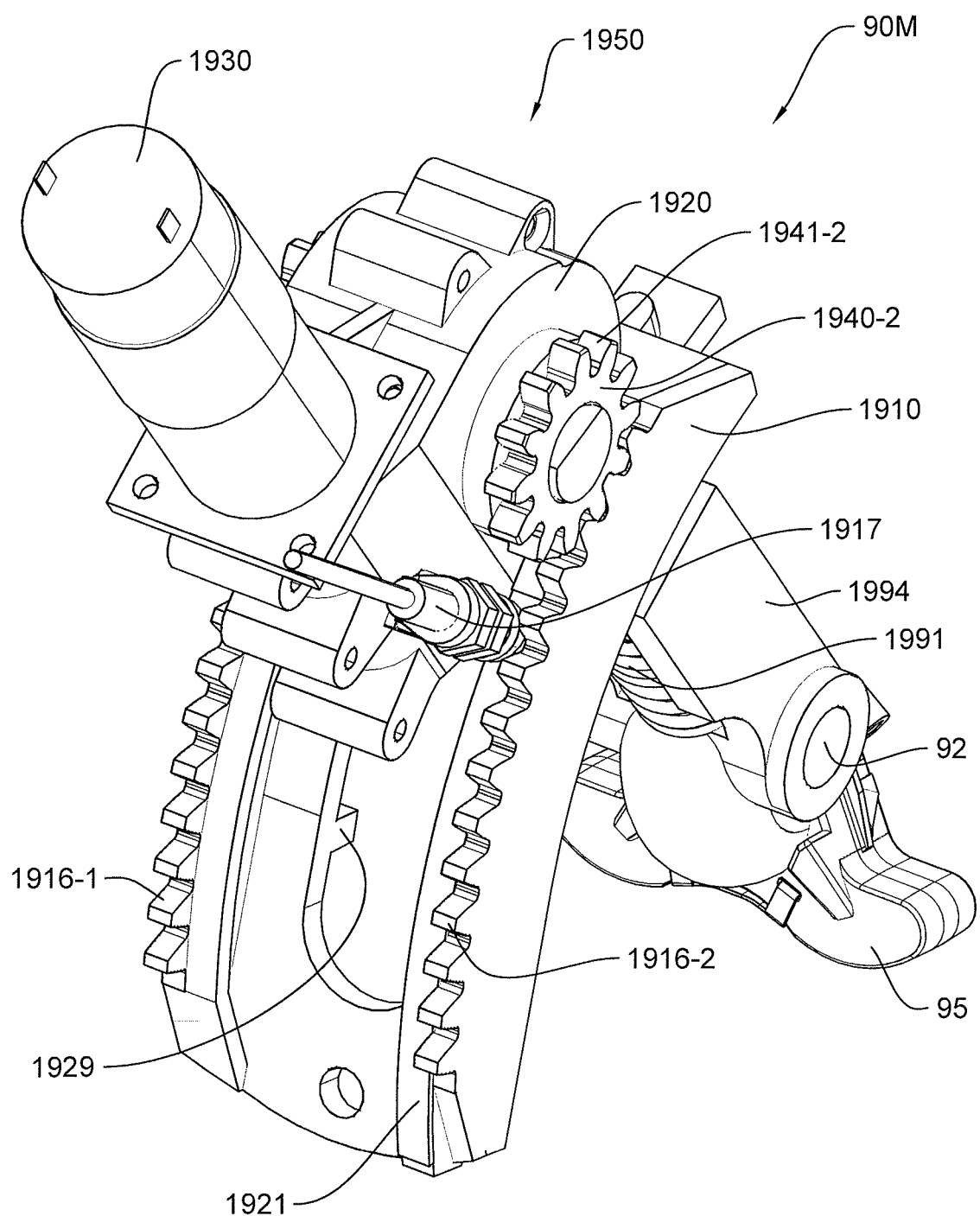
FIG. 20B is a perspective view of the embodiment of FIG. 20A.
Figure 20C:
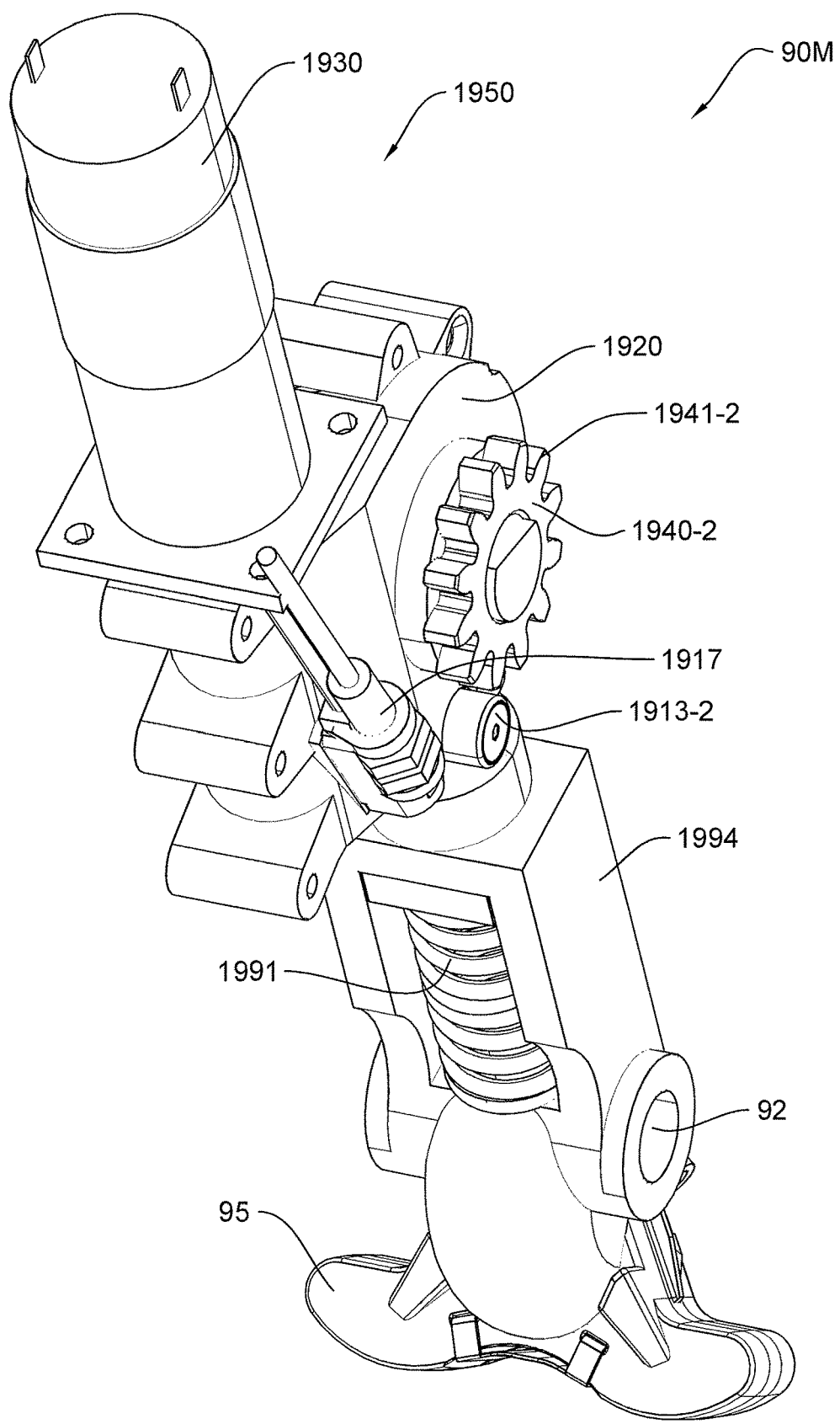
FIG. 20C is a perspective view of the embodiment of FIG. 20B with the gear rack removed.
Figure 20D:
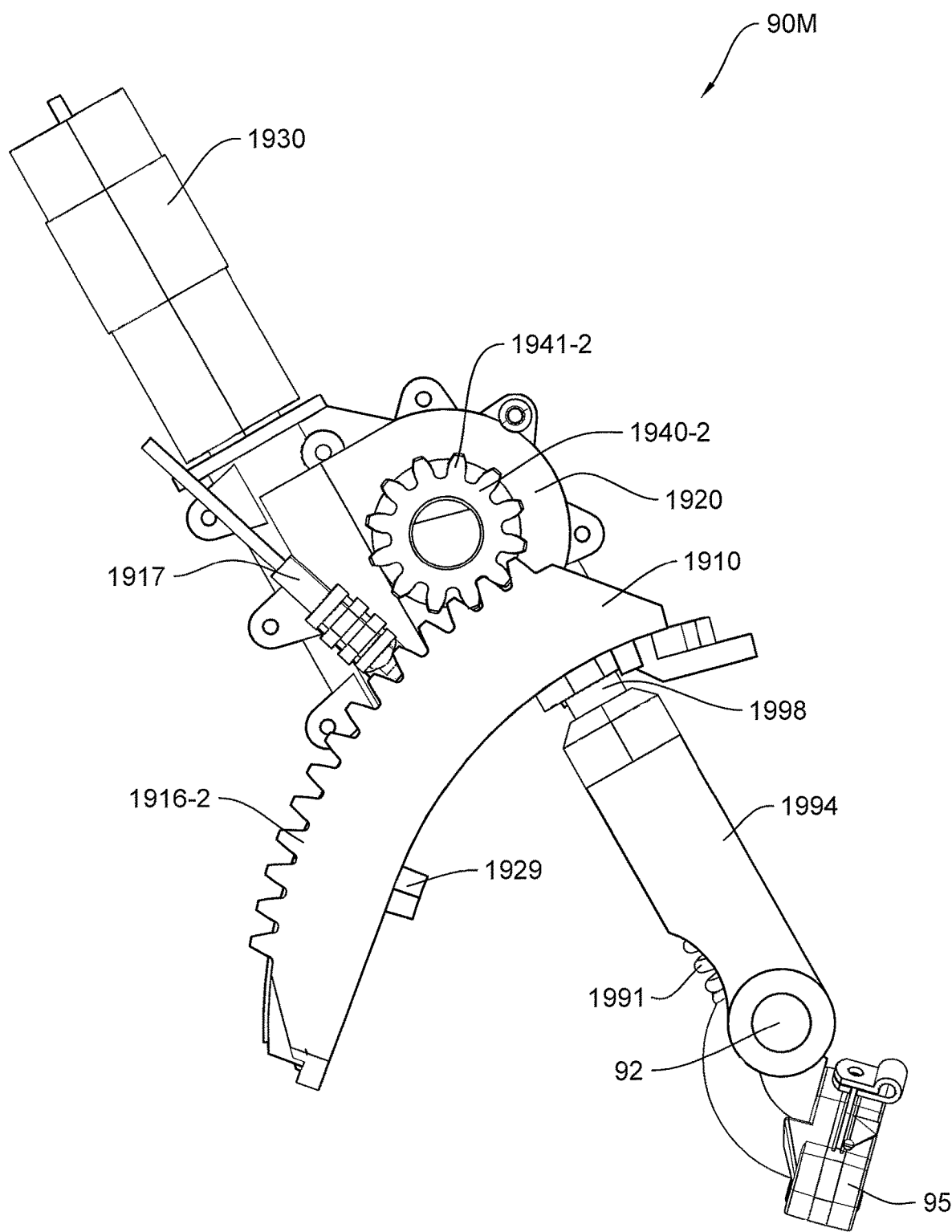
FIG. 20D is a right side view of the embodiment of FIG. 20B.
Figure 20E:
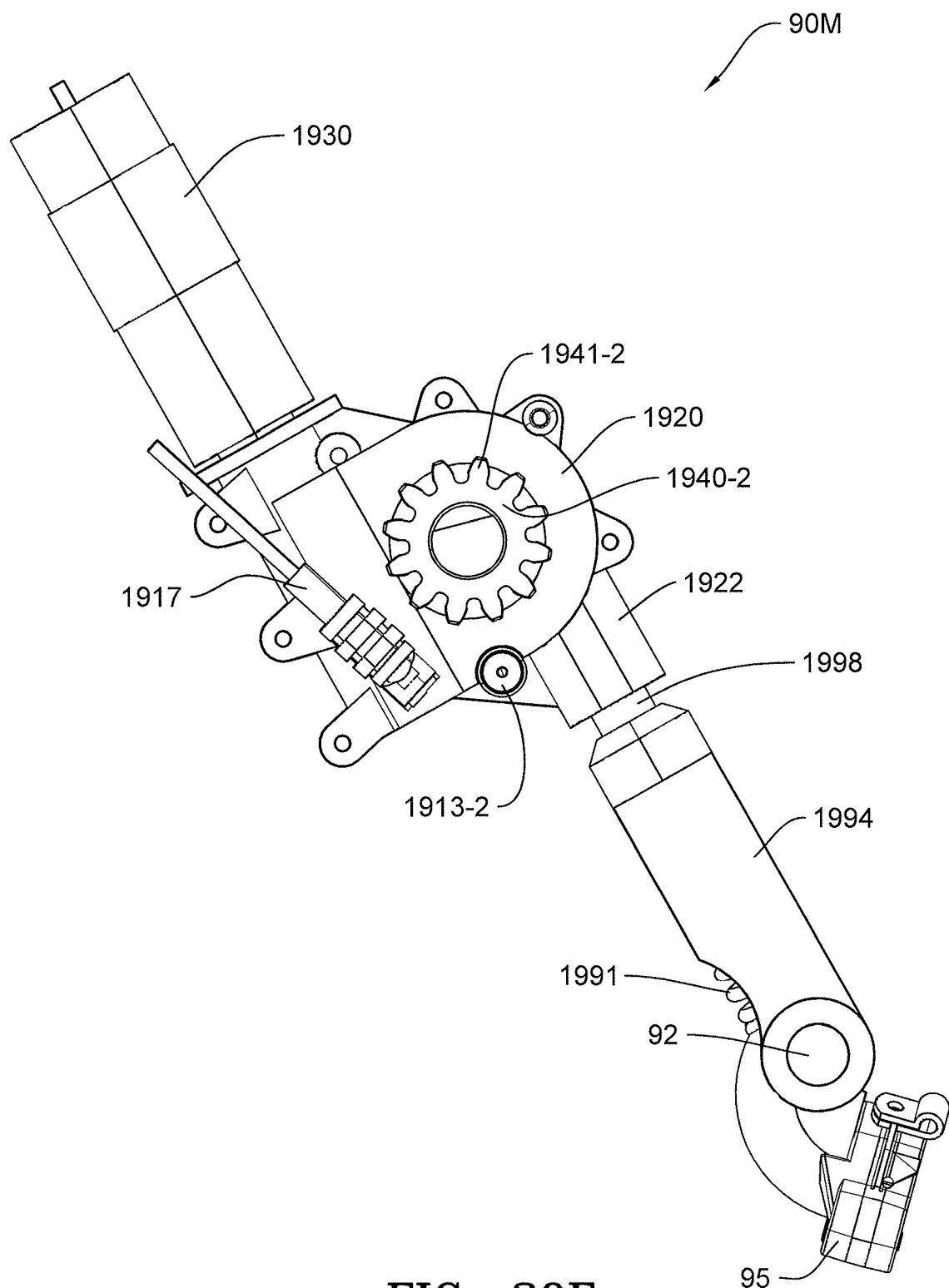
FIG. 20E is a right side view of the embodiment of FIG. 20C.
Figure 20F:
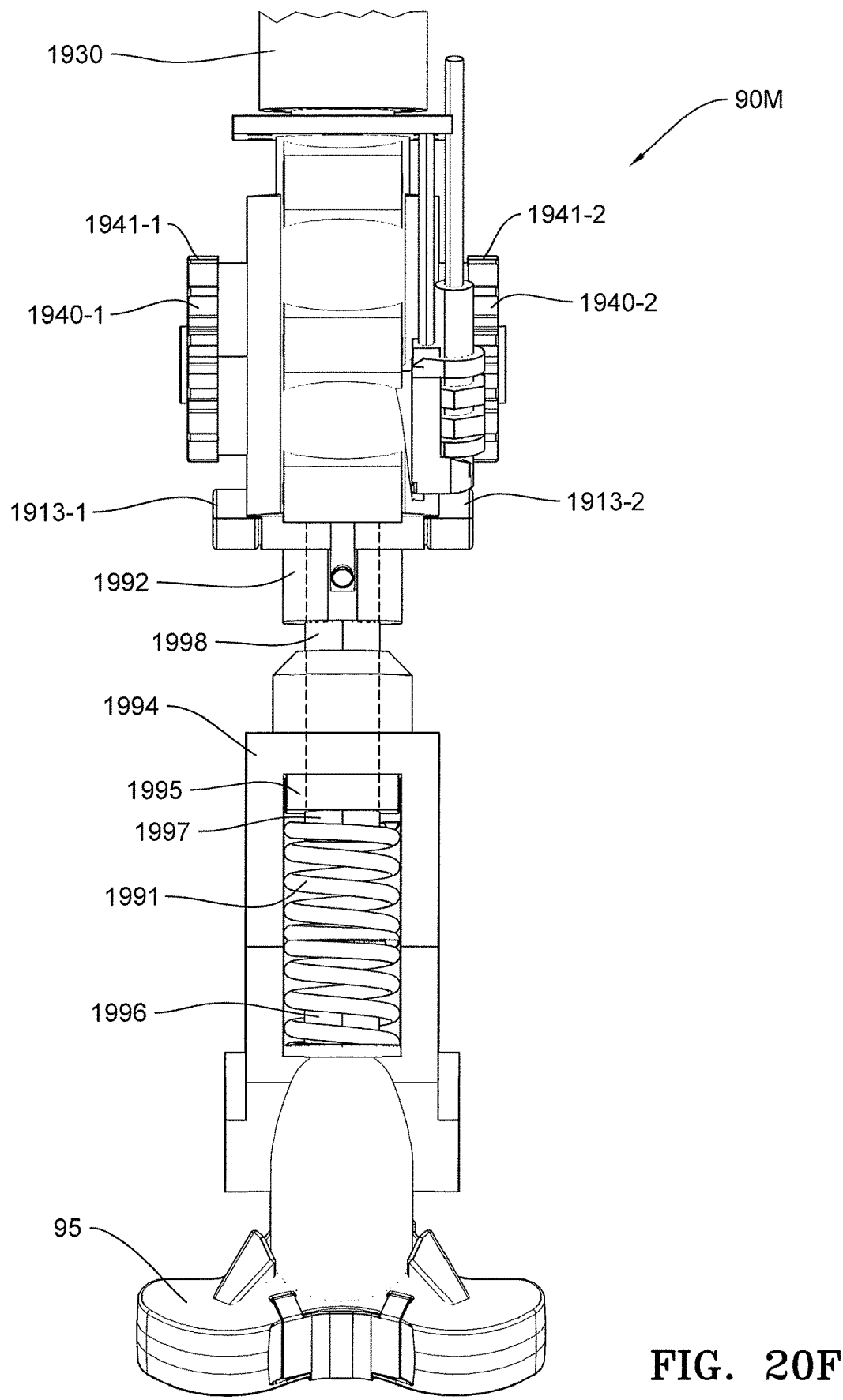
FIG. 20F is a rear view of the embodiment of FIG. 20C.

As best viewed in FIG. 20F, gear box 1920 is connected via shaft 1998 to depth adjustment body 1994 which pivots about pivot 92 to adjust rocker 95. In one embodiment, shaft 1998 is connected to gear box 1920 via connection 1922. Shaft 1998 terminates with annular lip 1995 inside depth adjustment body 1994. Disposed in depth adjustment body 1994 is force member 1991 (such as a spring) to force shaft 1998 via annular lip 1995 away from depth adjustment body 1994. In the embodiment when force member 1991 is a spring, annular lip 1995 can have a nub 1997 and depth adjustment body 1994 can have a nub 1996 about which spring 1991 is disposed to help retain spring 1991 within depth adjustment body 1994.

Figure 20G:
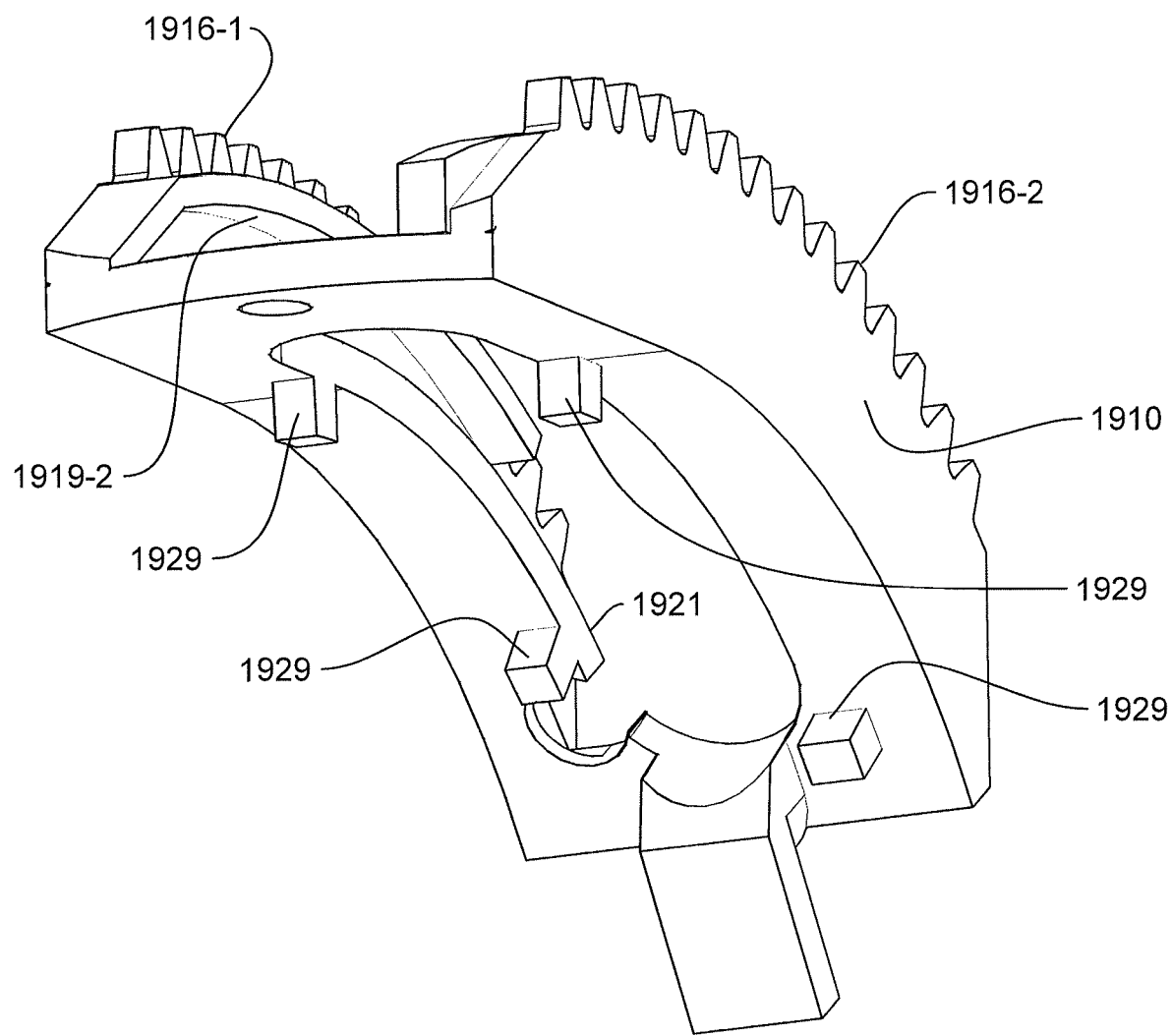
FIG. 20G is a perspective view of the bottom of the gear rack of the embodiment of FIGS. 20A to 20E.
Figure 20H:
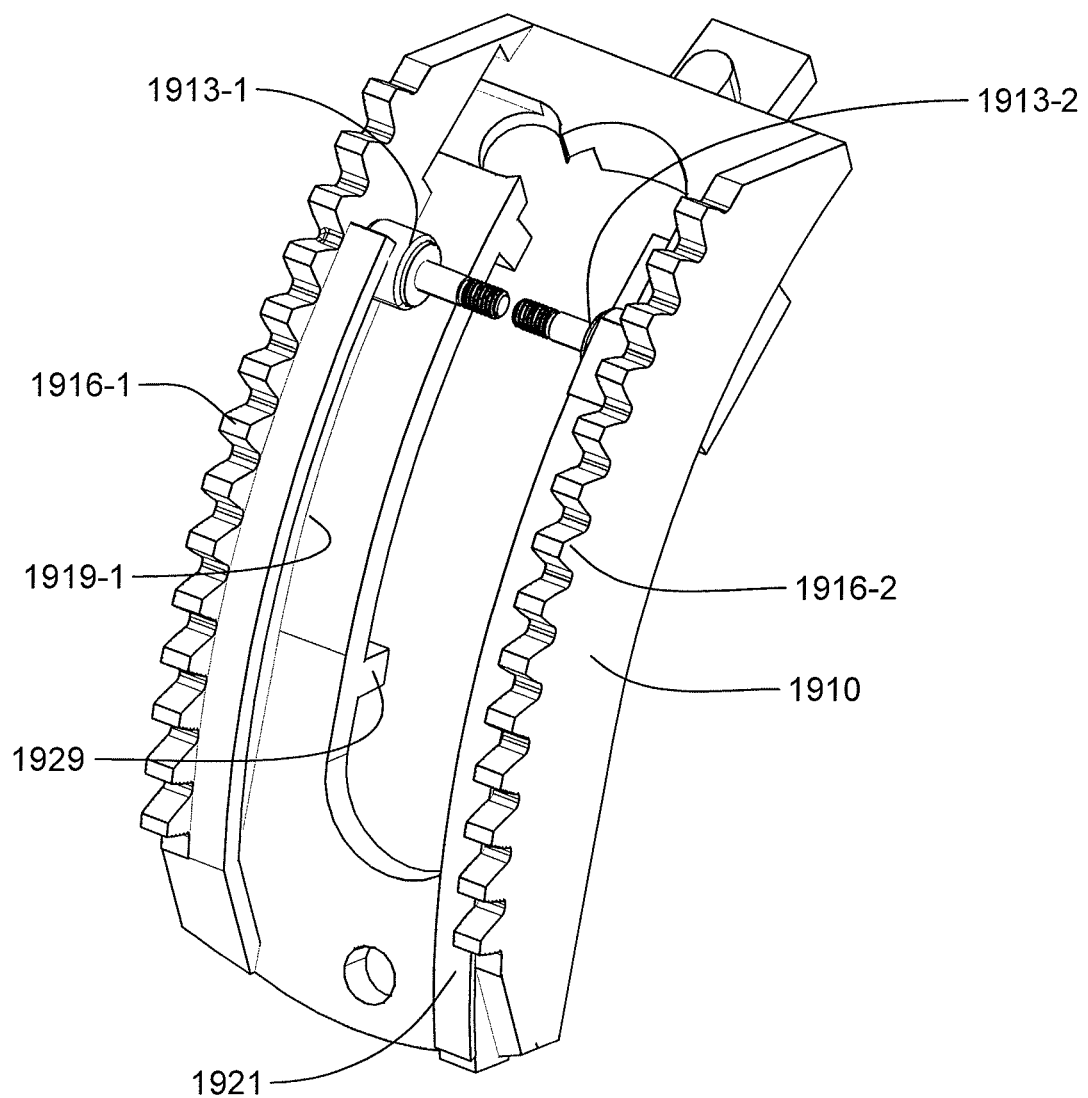
FIG. 20H is a perspective view of the gear rack and rollers of the embodiment of FIGS. 20A to 20E and 20F.

As best viewed in FIG. 20G, gear rack 1910 in one embodiment can have one or more protrusions 1929. Protrusions 1929 can engage with the depth adjustment notches on frame 14, which are typically found on most frames (not shown).

Figure 20I:
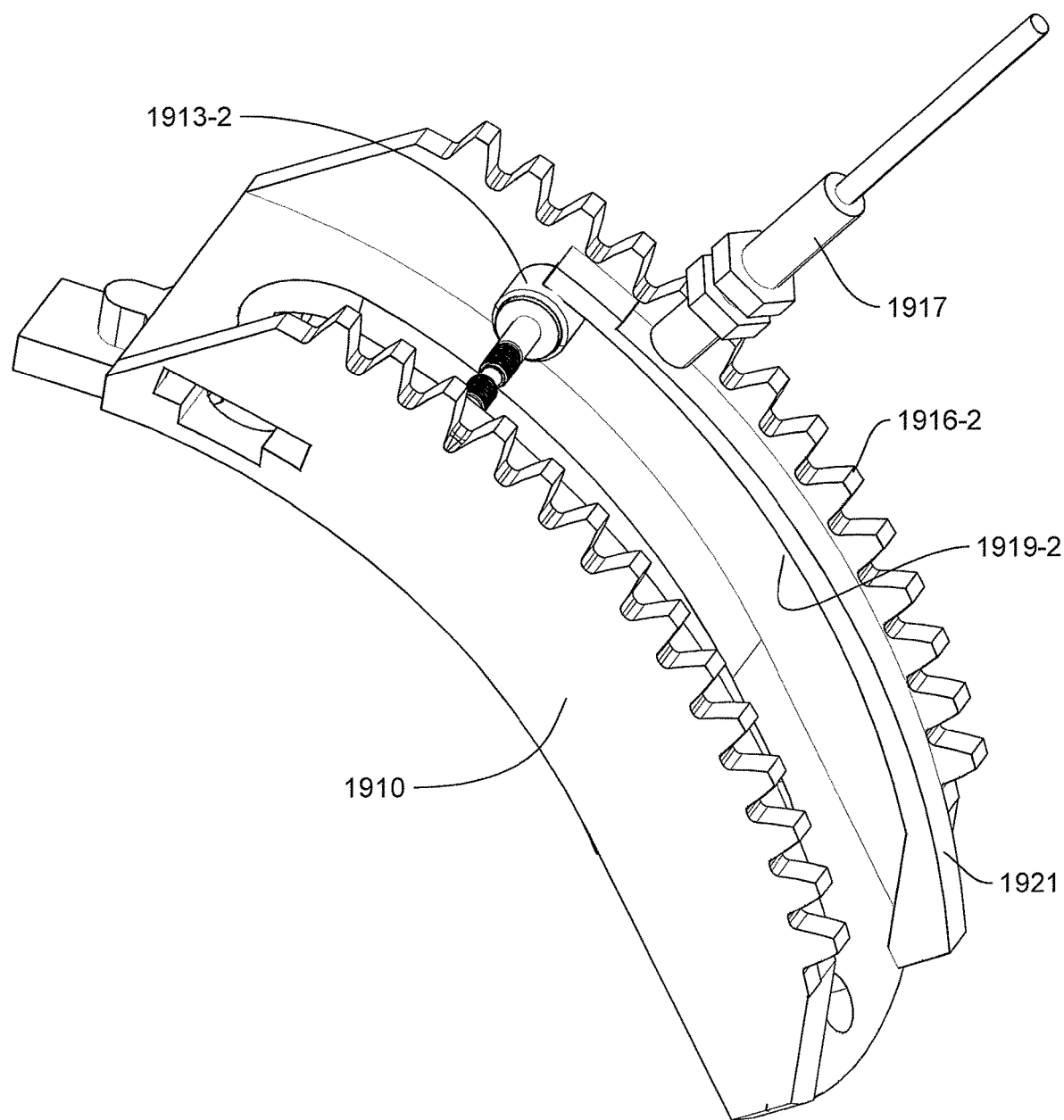
FIG. 20I is a perspective view of the gear rack of FIG. 20H taken along section A-A.

Gear box 1920 has wheels 1913-1 and 1913-2 attached to its side. Wheels 1913-1 and 1913-2 engage shelves 1919-1 and 1919-2, respectively, on gear rack 1910. The engagement of wheels 1913-1 and 1913-2 can be best viewed in FIGS. 20H and 20I. FIG. 20I is a perspective view of gear rack 1710 showing the changing radius of ledge 1921 with respect to teeth 1916-2 and ledge 1919-2.

Figure 20J:
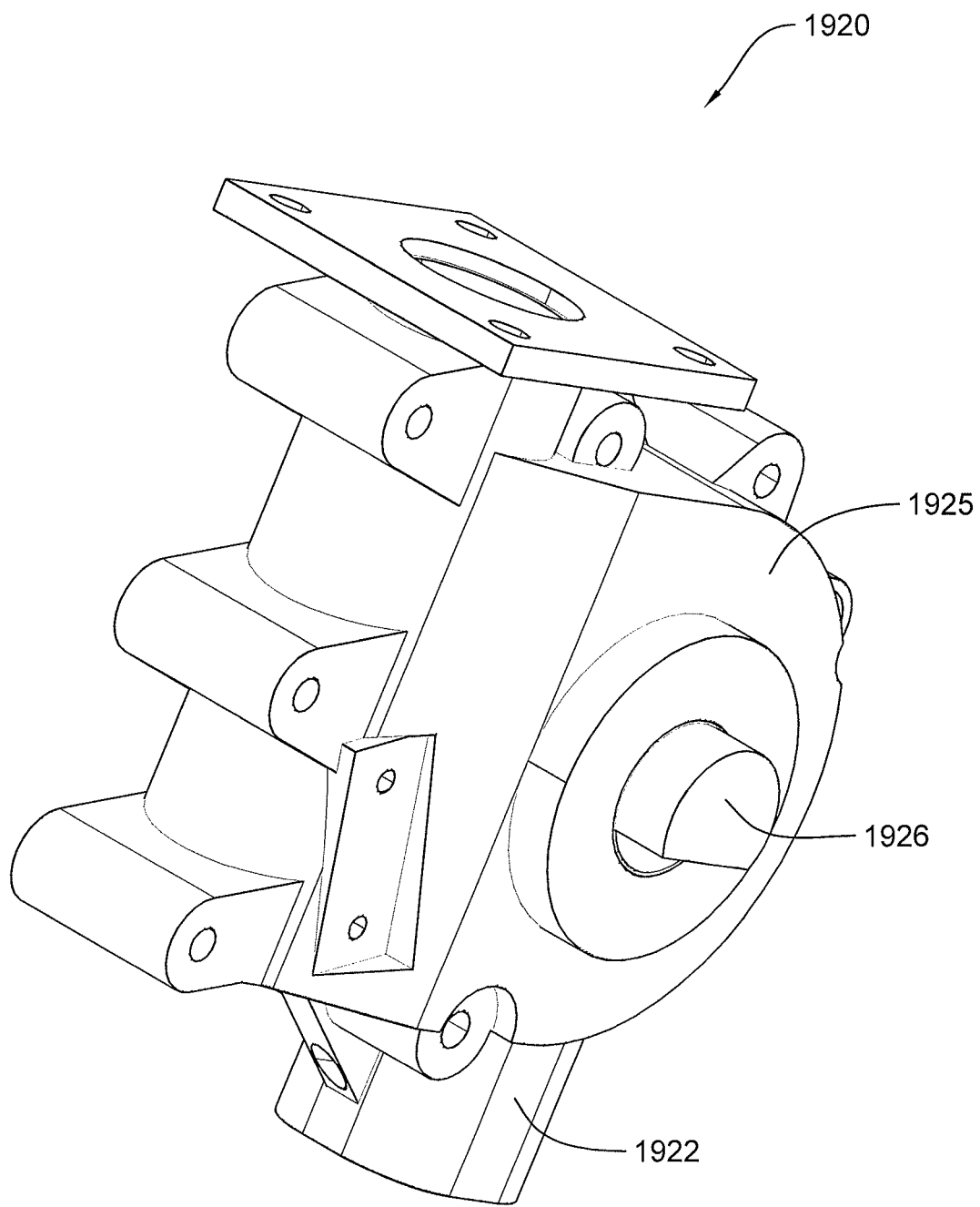
FIG. 20J is a perspective view of the gear box of the embodiments of FIGS. 20A to 20F.
Figure 20K:
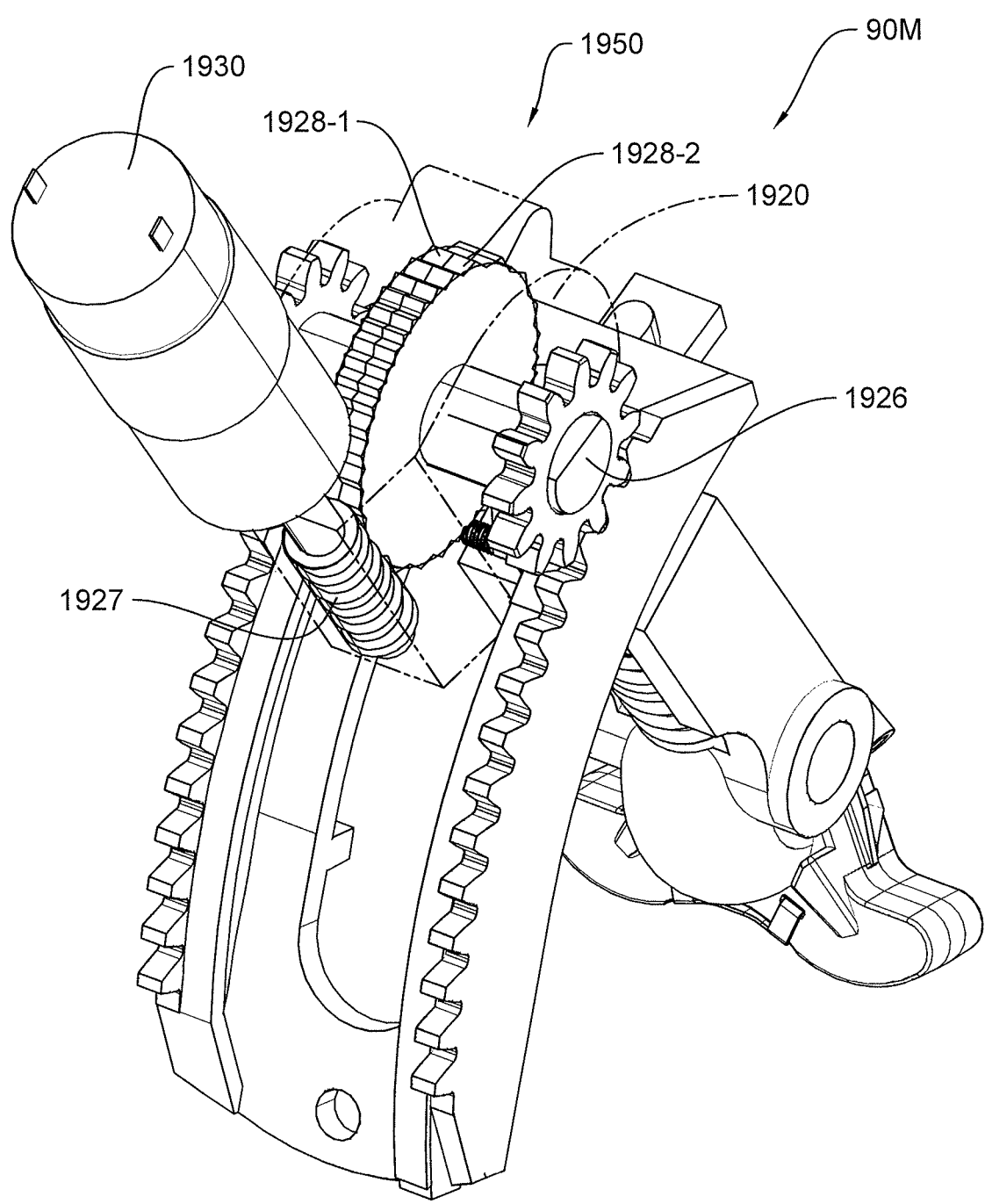
FIG. 20K is a perspective view of the worm gear and wheel inside of the gear box of FIG. 20J.

FIG. 20J shows gear box 1920, and FIG. 20K shows the internal parts of gear box 1920 with gear box housing 1925 removed to show worm gear 1927, wheel 1928 (or 1928-1 and 1928-2) and shaft 1926. Worm gear 1927 is driven by motor 1930 and turns wheel gear 1928 and shaft 1926. Gears 1940-1 and 1940-2 are disposed about shaft 1926. In one embodiment, worm gear 1927 and wheel gear 1928 are made from powdered metal. In one embodiment for ease of assembly, wheel gear 1928 is made in two parts, left wheel gear 1928-1 and right wheel gear 1928-2, all of which can be made from powdered metal.

Figure 21:
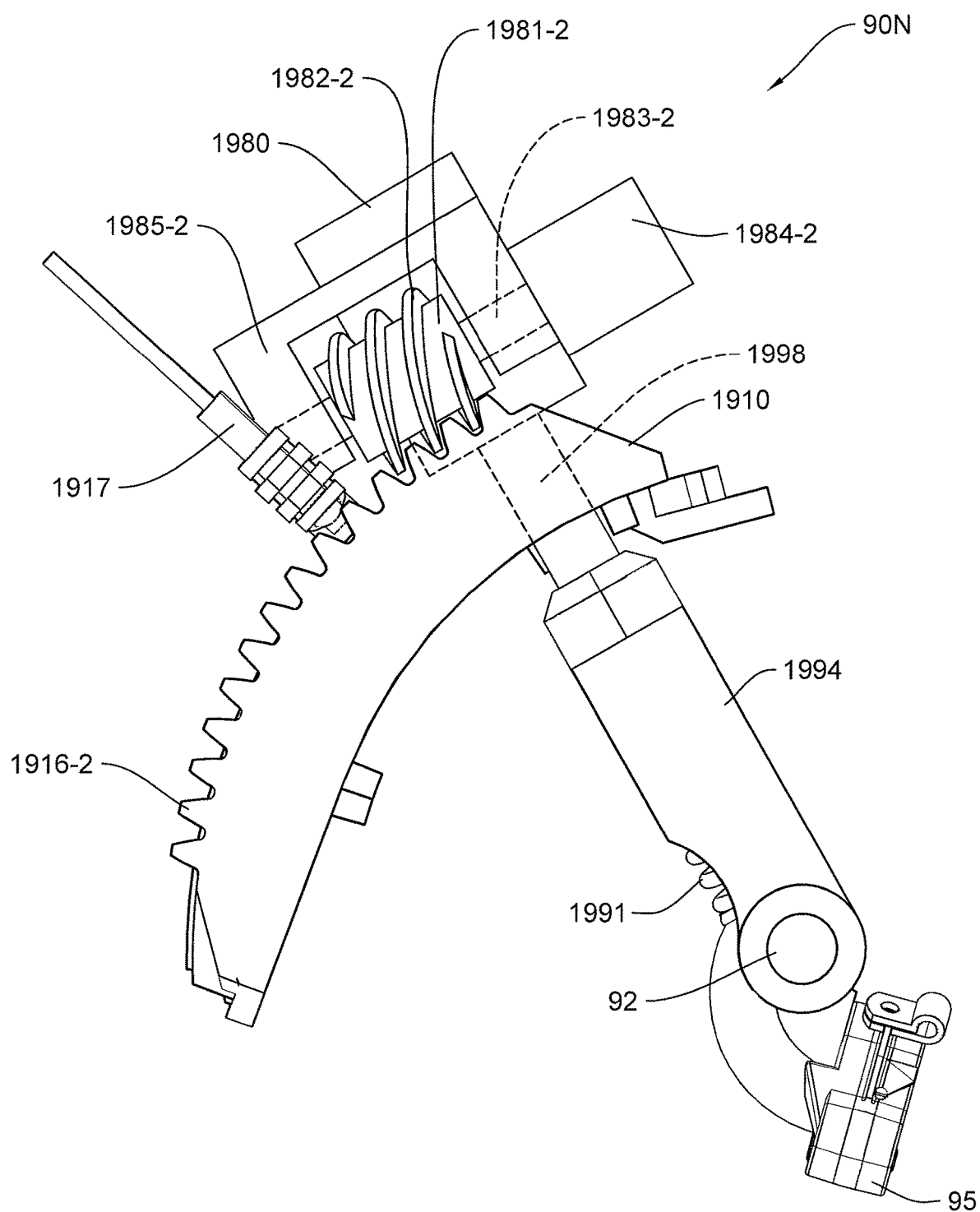
FIG. 21 is a side elevation of another embodiment of a depth adjustment assembly with a position location system

FIG. 21 is a side elevation view of another embodiment of a depth adjustment assembly 90N. Assembly 90N is an alternative to assembly 90M in which the wheel gears/pinions are replaced with one or more worm gears. In this embodiment, gear box 1980 is connected via shaft 1998 to depth adjustment body 1994 which pivots about pivot 92 to adjust rocker 95. Disposed on either or both sides of gear box 1980 and positioned over gear rack 1910 is a worm gear 1981 having flights 1982 that engage with the teeth 1916 of the gear rack 1910. The worm gear 1981 has a shaft 1983 which is rotatably driven by an electric motor 1984. The shaft 1983 is supported within a U-shaped bracket 1985 which is supported by the gear box 1980. For consistency with the previously described embodiments, it should be appreciated that the depth adjustment assembly 90N may comprise corresponding left and right worm gears 1981, flights 1982, shafts 1983, motors 1984 and brackets 1985 differentiated by the suffix "−1" and "−2" for those components disposed over the respective left and right gear teeth 1916-1, 1916-2 of the gear rack 1910. However, because FIG. 21 is a sided elevation view, only the "−2" components are visible.

There are other row units with manual adjustments similar to those described herein. Non-limiting examples can be found in US20170000003 and US20170006757, both of which are incorporated herein by reference. The depth adjustment assemblies described herein work with similar systems with rockers, pivot, and adjustment arms.

Depth Control Systems

Figure 11:
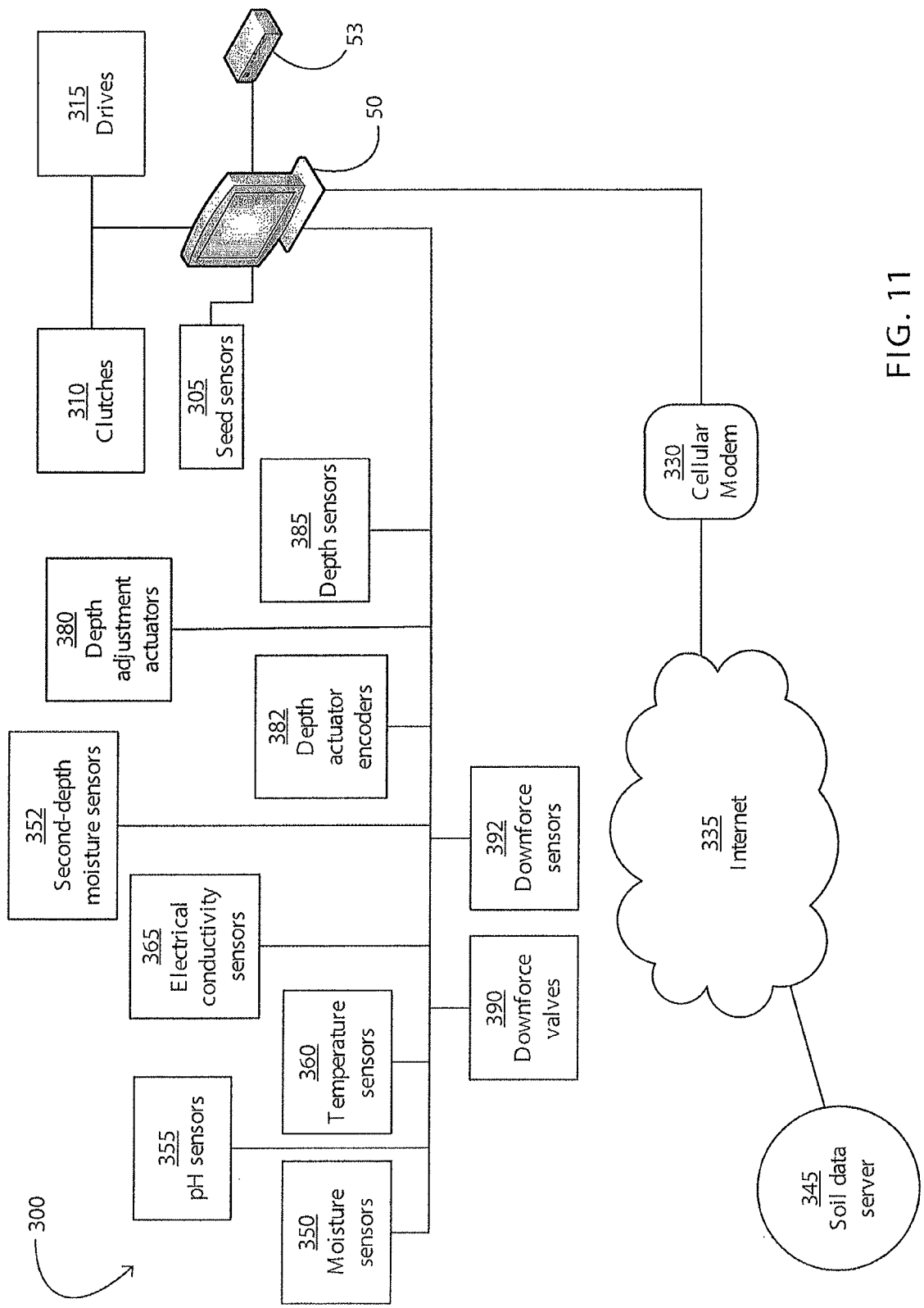
FIG. 11 schematically illustrates an embodiment of a system for controlling furrow depth.

The depth adjustment actuators/motors (e.g., secondary depth adjustment actuators/motors) disclosed herein (e.g., actuators/motors 720, 800, 950, 1000, 1230, 1450, 1550, 1650, 1750, 1850, 1950, 1984) may be in data communication with a depth control and soil monitoring system 300 as illustrated in FIG. 11 and described herein.

In the system 300, a monitor 50 is preferably in electrical communication with components associated with each row unit 10 including seed meter drives 315, seed sensors 305, the GPS receiver 53, downforce sensors 392, downforce valves 390, depth adjustment actuators 380, and depth actuator encoders 382 (and in some embodiments actual depth sensors 385 such as those described in applicant's International Patent Pub. No. WO2014/066654, incorporated by reference herein). In some embodiments, particularly those in which each seed meter 30 is not driven by an individual drive 315, the monitor 50 is also preferably in electrical communication with clutches 310 configured to selectively operably couple the seed meter 30 to the drive 315.

Continuing to refer to FIG. 11, the monitor 50 is preferably in electrical communication with a cellular modem 330 or other component configured to place the monitor 50 in data communication with the Internet, indicated by reference numeral 335. Via the Internet connection, the monitor 50 preferably receives data from a soil data server 345. The soil data server 345 preferably includes soil map files (e.g., shape files) associating soil types (or other soil characteristics) with GPS locations. In some embodiments, soil map files are stored in the memory of the monitor 50.

The monitor 50 is also preferably in electrical communication with one or more temperature sensors 360 mounted to the planter and configured to generate a signal related to the temperature of soil being worked by the planter row units 10. In some embodiments one or more of the temperature sensors 360 comprise thermocouples disposed to engage the soil as disclosed in Applicant's International Patent Pub. No. WO2014/153157, the disclosure of which is incorporated herein in its entirety by reference. In such embodiments, the temperature sensors 360 preferably engage the soil at the bottom of the trench 38. In other embodiments, one or more of the temperature sensors 360 may comprise a sensor disposed and configured to measure the temperature of the soil without contacting the soil as disclosed in International Patent Pub. No. WO2012/149398, the disclosure of which is hereby incorporated herein in its entirety by reference.

Referring to FIG. 11, the monitor 50 is preferably in electrical communication with one or more moisture sensors 350 mounted to the planter and configured to generate a signal related to the temperature of soil being worked by the planter row units 10. In some embodiments, the moisture sensor 350 comprises a reflectance sensor such as that disclosed in U.S. Pat. No. 8,204,689, hereby incorporated herein in its entirety by reference. In such embodiments, the moisture sensor 350 is preferably mounted to the shank 15 of the row unit 10 and disposed to measure the soil moisture at the bottom of the trench 38, preferably at a position longitudinally forward of the seed tube 32. The monitor 50 is preferably in electrical communication with one or more second-depth moisture sensors 352. The second-depth moisture sensor 352 preferably comprises a reflectance sensor such as that disclosed in the '689 application, disposed to measure soil moisture at a depth at which consistent moisture reading is expected. In some embodiments the second-depth moisture sensor 352 is disposed to measure soil moisture at a greater depth than used for planting, such as between 3 and 6 inches and preferably approximately 4 inches below the soil surface. In other embodiments the second-depth moisture sensor 352 is disposed to measure soil moisture at a lesser depth than used for planting, such as between 0.25 inch and 1 inch and preferably approximately 0.5 inch below the soil surface. The second-depth moisture sensor 352 is preferably disposed to open a trench laterally offset from the trenches 38 opened by the row units 10.

Referring to FIG. 11, the monitor 50 is preferably in electrical communication with one or more electrical conductivity sensors 365. The electrical conductivity sensor 365 preferably comprises one or more electrodes disposed to cut into the soil surface such as the sensors disclosed in U.S. Pat. Nos. 5,841,282 and 5,524,560, both of which are hereby incorporated herein in their entirety by reference.

Referring to FIG. 11, the monitor 50 is preferably in electrical communication with one or more pH sensors 355. In some embodiments the pH sensor 355 is drawn by a tractor or by another implement (e.g., a tillage implement) such that data is stored in the monitor 50 for later use. In some such embodiments, the pH sensor 355 is similar to that disclosed in U.S. Pat. No. 6,356,830. In some embodiments, the pH sensor 355 is mounted to the toolbar 8, preferably at a position laterally offset from the row units 10.

Depth Control Methods

According to some exemplary processes of controlling depth using the depth adjustment assemblies described herein, a user may manually adjust the primary and/or secondary depth adjustment assemblies.

According to some exemplary processes, the user may manually adjust the primary depth adjustment assembly and use the monitor 50 to command a depth adjustment to the secondary depth adjustment assembly.

According to some exemplary processes, the user may manually adjust the primary depth adjustment assembly and the monitor 50 may command a desired depth adjustment to the secondary depth adjustment assembly (e.g., one of the actuators/motors 720, 800, 950, 1000, 1230, 1450, 1550, 1650, 1750, 1850, 1950, 1984) by receiving one or more agronomic variables from the sensors (e.g., sensors 350, 355, 360, 365, 352, 385) or from the soil data server 345 and determining a desired depth adjustment by consulting a database or algorithm relating one or more agronomic variables to a desired furrow depth.

According to some exemplary processes, the monitor 50 may command a desired depth adjustment to the primary depth adjustment assembly and/or to the secondary depth adjustment assembly (e.g., one of the actuators/motors 720, 800, 950, 1000, 1230, 1450, 1550, 1650, 1750, 1850, 1950, 1984) by receiving one or more agronomic variables from the sensors (e.g., sensors 350, 355, 360, 365, 352, 385) or from the soil data server 345 and determining a desired depth adjustment by consulting a database or algorithm relating one or more agronomic variables to a desired furrow depth.

According to some exemplary processes, the monitor 50 may command a desired depth adjustment to the primary depth adjustment assembly and/or to the secondary depth adjustment assembly (e.g., one of the actuators/motors 720, 800, 950, 1000, 1230, 1450, 1550, 1650, 1750, 1850, 1950, 1984) by determining the GPS-reported location of the row unit 10 and consulting a depth prescription map spatially relating locations and/or regions in the field to desired furrow depths.

In some embodiments, the monitor 50 may record changes in depth in the field by associating commanded actuations of the actuator/motor 720, 800, 950, 1000, 1230, 1450, 1550, 1650, 1750, 1850, 1950, 1984 with GPS locations reported by the GPS receiver 52. In some such embodiments, the monitor 50 may record a change in depth concurrently with the commanded actuations of the actuator/motor 720, 800, 950, 1000, 1230, 1450, 1550, 1650, 1750, 1850, 1950. However, in operation, the force between the rocker 95 and the gauge wheel arm and/or the depth adjustment member may vary, e.g., as the row unit moves across uneven terrain. Thus in some embodiments the monitor 50 may monitor the force on the gauge wheel arm and/or the depth adjustment rocker and record the change in depth only when the force is lower than a predetermined threshold. For example, with respect to the embodiment of FIG. 12, the monitor 50 may monitor the force on the gauge wheel arm and/or the depth adjustment rocker and record the change in depth only when the force is lower than a predetermined threshold at which the depth adjustment member can be advanced for a given position of the actuator 1230. The force on the gauge wheel arm and/or the depth adjustment rocker may be recorded by a load sensor such as a strain gauge mounted to the gauge wheel arm or other location through which the force is transmitted, or by a load sensing pin incorporated in the row unit as is known in the art.

In other implementations, the monitor 50 may command a temporary change (e.g., reduction) in row unit downforce applied by the actuator 18 concurrently with (or before or after) a commanded change in the extension of the actuator/motor 720, 800, 950, 1000, 1230, 1450, 1550, 1650, 1750, 1850, 1950, 1984 in order to permit the depth adjustment. The monitor 50 then preferably commands the row unit downforce applied by the actuator 18 to return to its previously commanded level.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural planting system for controlling the depth of an opener device in an agricultural planter, the agricultural planting system comprising:
    an agricultural planter;
    an opener device mounted on the agricultural planter for engaging the ground of a field;
    a gauge wheel mounted on the agricultural planter for rotating on the ground of the field;
    a GPS device coupled to the agricultural planter, the GPS device configured to determine a location of the agricultural planter in the field; and
    a controller in electrical communication with the agricultural planter and the GPS device, the controller having predetermined settings associated with a map of the field, the controller being configured to select a relative elevation of the opener device and the gauge wheel based at least in part on the location determined by the GPS device, and produce, based on the location, a signal for adjusting the depth of engagement into the ground of the opener device.

2. The agricultural planting system of claim 1, wherein the map of the field includes a topographical map, a soil temperature map, a soil moisture map, or in any combination thereof.

3. The agricultural planting system of claim 1, wherein the relative elevation of the opener device and the gauge wheel is selected automatically in response to the map of the field.

4. A method of controlling the depth of an opener device in an agricultural planter, the method comprising:
- determining, via a GPS device, a location of an agricultural planter in a field, the agricultural planter including an opener device for engaging the ground of the field and a gauge wheel for rotating on the ground of the field;
- receiving, via an input device, a map of the field; and
- based at least in part on the location of the agricultural planter in the field and the map of the field, producing a signal for selecting a relative elevation of the opener device and the gauge wheel, thereby adjusting the depth of engagement into the ground of the opener device.

5. The method of claim 4, wherein the map of the field includes a topographical map, a soil temperature map, a soil moisture map, or in any combination thereof.

6. The method of claim 4, wherein the relative elevation of the opener device and the gauge wheel is selected automatically in response to the map of the field.

\* \* \* \* \*